United States Patent
Sundararajan et al.

(10) Patent No.: US 9,622,134 B2
(45) Date of Patent: Apr. 11, 2017

(54) COORDINATING HANDOVER EVENTS ACROSS RATS

(71) Applicant: QUALCOMM Incorporated, San Diego, CA (US)

(72) Inventors: Jay Kumar Sundararajan, San Diego, CA (US); Manu Sharma, San Diego, CA (US); Arnaud Meylan, San Diego, CA (US); Gavin Bernard Horn, La Jolla, CA (US); Kiran Kumar Somasundaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 14/270,295

(22) Filed: May 5, 2014

(65) Prior Publication Data

US 2014/0329526 A1  Nov. 6, 2014

Related U.S. Application Data

(60) Provisional application No. 61/820,098, filed on May 6, 2013.

(51) Int. Cl.
*H04W 36/24* (2009.01)
*H04W 36/00* (2009.01)
(Continued)

(52) U.S. Cl.
CPC ........... *H04W 36/24* (2013.01); *H04W 36/00* (2013.01); *H04W 36/0022* (2013.01);
(Continued)

(58) Field of Classification Search
CPC ........... H04W 72/0453; H04W 72/085; H04W 72/0406; H04W 84/12; H04W 36/0005;
(Continued)

(56) References Cited

U.S. PATENT DOCUMENTS

| 2005/0073977 | A1* | 4/2005 | Vanghi ............. H04W 36/0066 370/335 |
| 2008/0014942 | A1* | 1/2008 | Umesh et al. ................ 455/436 |

(Continued)

FOREIGN PATENT DOCUMENTS

| WO | WO-2011159215 A1 | 12/2011 |
| WO | WO-2013052805 A1 | 4/2013 |

OTHER PUBLICATIONS

Catt, "Handover for Carrier Aggregation," 3GPP TSG RAN WG2 Meeting #66bis, Los Angeles, USA, Jun. 29-Jul. 3, 2009, R2-093722, 3GPP Draft, downloaded from http://www.3gpp.org/ftp/tsg_ran/wg2_rl2/TSGR2_66bis/Docs/, 3 pgs.

(Continued)

*Primary Examiner* — Magdi Elhag
(74) *Attorney, Agent, or Firm* — Holland & Hart LLP

(57) ABSTRACT

Methods, systems, and devices are described for managing network communication between a UE and network equipment. The communication between the UE and the network equipment may be established over a first radio access technology (RAT) and a second RAT, and a coupling between the first RAT and the second RAT may be identified in the communication between the UE and the network equipment. At least one of a reselection procedure or a handover procedure for at least one of the RATs may be adapted based on the identified coupling between the first RAT and the second RAT.

29 Claims, 14 Drawing Sheets

(51) Int. Cl.
*H04W 36/14* (2009.01)
*H04W 88/06* (2009.01)
*H04W 88/10* (2009.01)

(52) U.S. Cl.
CPC ....... *H04W 36/0066* (2013.01); *H04W 36/14* (2013.01); *H04W 36/0083* (2013.01); *H04W 88/06* (2013.01); *H04W 88/10* (2013.01)

(58) Field of Classification Search
CPC . H04W 36/0083; H04W 36/00; H04W 36/14; H04W 36/18; H04W 36/24; H04W 36/0022
USPC .................. 455/432.1–444; 370/328–332
See application file for complete search history.

(56) References Cited

U.S. PATENT DOCUMENTS

| | | | | |
|---|---|---|---|---|
| 2008/0205345 A1* | 8/2008 | Sachs | ............... | H04W 36/0011 370/332 |
| 2010/0265914 A1* | 10/2010 | Song | ............... | H04W 48/18 370/331 |
| 2013/0097418 A1* | 4/2013 | Bhatt | ............... | H04L 63/0892 713/151 |
| 2013/0230022 A1* | 9/2013 | Guo et al. | ............... | 370/331 |
| 2013/0303168 A1* | 11/2013 | Aminzadeh Gohari | ............... | H04W 36/0083 455/436 |
| 2014/0162659 A1* | 6/2014 | Aminaka et al. | ............... | 455/437 |
| 2014/0307623 A1* | 10/2014 | Gheorghiu | ............... | H04W 76/026 370/328 |
| 2014/0328318 A1* | 11/2014 | Sundararajan | ............... | H04W 40/36 370/331 |
| 2014/0335883 A1* | 11/2014 | Ericson | ............... | H04W 72/0486 455/452.2 |
| 2015/0043486 A1* | 2/2015 | Ozturk | ............... | H04W 76/026 370/329 |
| 2015/0350954 A1* | 12/2015 | Faccin | ............... | H04W 76/026 370/254 |
| 2016/0088542 A1* | 3/2016 | Belghoul | ............... | H04W 36/22 370/331 |

OTHER PUBLICATIONS

QUALCOMM Incorporated, "WLAN/3GPP Radio Interworking Scope and Scenarios," 3GPP TSG-RAN2#81, Jan. 28-Feb. 1, 2013, St. Julian's, Malta, R2-130264, 3GPP Draft, downloaded from http://www.3gpp.org/ftp/tsg_ran/wg2_rl2/TSGR2_81/Docs/, 3 pgs.

ISA/EPO, International Search Report and Written Opinion of the International Searching Authority, Int'l. App. No. PCT/US2014/036992, Sep. 29, 2014, European Patent Office, Rijswijk, NL, 14 pgs.

* cited by examiner

COORDINATING HANDOVER EVENTS ACROSS RATS

CROSS REFERENCES

The present Application for Patent claims priority to U.S. Provisional Patent Application No. 61/820,098 by Sundararajan et al., entitled "Coordinating Handover Events Across RATs," filed May 6, 2013, assigned to the assignee hereof, and expressly incorporated by reference herein.

BACKGROUND

The following relates generally to wireless communication, and more specifically to an aggregation or coupling of disparate radio access technologies (RATs) to communicate data between a user equipment (UE) and network equipment. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with UEs on downstream and upstream links. Each base station has a coverage range, which may be referred to as the coverage area of the cell. In some cases, multiple RAT carriers may be aggregated or coupled to communicate data between a UE and network equipment (e.g., a base station). In these cases, there may be a need to determine UE and network equipment behaviors that provide traffic flow continuity and efficient carrier resource utilization in the event of a handover on one of the RATs.

SUMMARY

The present disclosure, for example, relates to one or more techniques for handover adaptation based on a coupling or aggregation of multiple RATs. According to the principles of the present specification, network communication between a UE and network equipment may be established over a first radio access technology (RAT) and a second RAT, and a coupling between the first RAT and the second RAT may be identified in the communication between the UE and the network equipment. A reselection procedure or a handover procedure for one of the RATs may be adapted based on the identified coupling between the first RAT and the second RAT.

In a first set of illustrative examples, a method for wireless communications by a UE is described. In one example, the method may include establishing communication between the UE and network equipment over a first RAT and a second RAT, identifying a coupling between the first RAT and the second RAT in the communication between the UE and the network equipment, and adapting, by the UE, at least one of a reselection procedure or a handover procedure for at least one of the RATs based on the identified coupling between the first RAT and the second RAT.

In some examples of the method, identifying the coupling between the first RAT and the second RAT may include determining that network traffic communicated between the UE and the network equipment over the first RAT and the second RAT is supported by at least one same bearer. In these examples, the method may further include determining that a handover of the UE would affect an ability of the UE to continue communicating network traffic supported by the at least one same bearer over both the first RAT and the second RAT at a current rate. In some examples, adapting the handover procedure may be in response to the determination that the handover would affect the ability of the UE to continue communicating network traffic supported by the at least one same bearer over both the first RAT and the second RAT at the current rate.

In some examples of the method, identifying the coupling between the first RAT and the second RAT may include identifying a carrier aggregation of at least one carrier of the first RAT with at least one carrier of the second RAT, or determining that the network equipment comprises collocated elements associated with the first RAT and the second RAT. In some examples, identifying the coupling between the first RAT and the second RAT may include receiving a unicast message from the network equipment over one of the RATs. The unicast message may indicate, for example, the coupling between the first RAT and the second RAT. In some examples, identifying the coupling between the first RAT and the second RAT may include receiving a broadcast message over at least one of the RATs advertising the coupling between the first RAT and the second RAT.

In some examples of the method, adapting the handover procedure for at least one of the RATs may include configuring the UE to initiate a handover event at the second RAT in response to detection of a handover event at the first RAT. In these examples, the method may further include configuring the UE to initiate the handover event at the second RAT in response to a determination that a target of the handover event at the second RAT satisfies at least one predetermined criterion. The at least one predetermined criterion may include a determination that network equipment associated with a target of the handover event at the first RAT and the target of the handover event at the second RAT supports the coupling of the first RAT and the second RAT. The method may further include configuring the UE to initiate the handover event at the second RAT in response to a determination that the target of the handover event at the first RAT is collocated with the target of the handover event at the second RAT.

In some examples of the method, adapting the reselection or handover procedure for at least one of the RATs may include configuring the UE to initiate a handover event at the second RAT based on a message received from the network equipment over the first RAT or the second RAT. In these examples, the message received from the network equipment may be in response to a handover event at the first RAT. In some examples of the method, adapting the reselection or handover procedure for at least one of the RATs may include configuring the UE to suppress a default handover procedure for the at least one of the RATs. In some examples of the method, adapting the reselection or handover procedure for at least one of the RATs may also include modifying a set of measurement events. The measurement events may be configured to trigger the UE to obtain channel measurements or provide measurement reports to the network equipment.

In some examples, the method further includes transmitting and receiving wireless traffic over a set of ports associated with one of the RATS. In these examples, the reselection procedure or handover procedure may be adapted for a subset of the set of ports.

In a second set of illustrative examples, a user equipment (UE) apparatus is described. In one example, the UE apparatus may include a first radio associated with a first RAT, a second radio associated with a second RAT, a processor, a memory in electronic communication with the processor, and instructions embodied in the memory. The instructions may be executable by the processor to establish communication between the UE apparatus and network equipment over a first radio access technology (RAT) and a second RAT, to identify a coupling between the first RAT and the second RAT in the communication between the UE apparatus and the network equipment, and to adapt at least one of a reselection procedure or a handover procedure for at least one of the RATs based on the identified coupling between the first RAT and the second RAT.

In some examples, the instructions may also be executable by the processor to determine that network traffic communicated between the UE apparatus and the network equipment over the first RAT and the second RAT is supported by at least one same bearer. In some examples, the instructions may also be executable by the processor to determine that handover of the UE apparatus would affect an ability of the UE apparatus to continue communicating network traffic supported by the at least one same bearer over both the first RAT and the second RAT at a current rate. In these examples, adapting the handover procedure may be in response to the determination that the handover would affect the ability of the UE apparatus to continue communicating network traffic supported by the at least one same bearer over both the first RAT and the second RAT at the current rate. In some examples, the instructions may also be executable by the processor to implement one or more aspects of the method for wireless communication described above with respect to the first set of illustrative examples.

In a third set of illustrative examples, a method of wireless communications by network equipment is described. In one example, the method may include establishing communication between the network equipment and a user equipment (UE) over a first radio access technology (RAT) and a second RAT, identifying a coupling between the first RAT and the second RAT in the communication between the network equipment and the UE, and adapting, by the network equipment, at least one of a reselection procedure or a handover procedure for at least one of the RATs based on the identified coupling between the first RAT and the second RAT.

In some examples of the method, identifying the coupling between the first RAT and the second RAT may include determining that network traffic communicated between the network equipment and the UE over the first RAT and the second RAT is supported by at least one same bearer. In these examples, the method may further include determining that a handover of the UE would affect an ability of the UE to continue communicating network traffic supported by the at least one same bearer over both the first RAT and the second RAT at a current rate. In some examples, adapting the handover procedure may be in response to the determination that the handover would affect the ability of the UE to continue communicating network traffic supported by the at least one same bearer over both the first RAT and the second RAT at the current rate.

In some examples of the method, identifying the coupling between the first RAT and the second RAT may include identifying a carrier aggregation of at least one carrier of the first RAT with at least one carrier of the second RAT, or determining that the network equipment comprises collocated elements associated with the first RAT and the second RAT.

In some examples of the method, adapting the handover procedure for at least one of the RATs may include detecting a handover event of the UE at the first RAT, and transmitting a message to the UE, in response to the handover event at the first RAT. The message may identify, for example, a target associated with a handover event at the second RAT. In these examples, the method may further include transmitting the message to the UE in further response to a determination that a target of the handover event at the first RAT and the target of the handover event at the second RAT support the coupling between the first RAT and the second RAT.

In some examples of the method, adapting the reselection or handover procedure may include communicating with the UE to modify a set of measurement events. The measurement events may be configured to trigger the UE to obtain channel measurements or provide measurement reports to the network equipment. In these examples, modifying the set of measurement events may include configuring at least one new value of a signal strength threshold that triggers the UE to perform channel measurements or provide a measurement report to the network equipment.

In some examples of the method, adapting the reselection or handover procedure may be further based on measured network conditions of at least one of the RATs. In some examples of the method, adapting the reselection or handover procedure may be further based on at least one of a policy stored by the network equipment or a service class of the UE. In some examples, at least one of the RATs may include a wireless wide area network (WWAN) RAT and the other of the RATs may include a wireless local area network (WLAN) RAT.

In a fourth set of illustrative examples, a network equipment apparatus is described. In one example, the network equipment apparatus may include a first radio associated with a first RAT, a second radio associated with a second RAT, a processor, a memory in electronic communication with the processor, and instructions embodied in the memory. The instructions may be executable by the processor to establish communication between the network equipment apparatus and a user equipment (UE) over a first radio access technology (RAT) and a second RAT, to identify a coupling between the first RAT and the second RAT in the communication between the network equipment apparatus and the UE, and to adapt at least one of a reselection procedure or a handover procedure for at least one of the RATs based on the identified coupling between the first RAT and the second RAT.

In some examples, the instructions may also be executable by the processor to determine that network traffic communicated between the network equipment and the UE over the first RAT and the second RAT is supported by at least one same bearer. In some examples, the instructions may also be executable by the processor to detect a handover event of the UE at the first RAT, and to transmit a message to the UE, in response to the handover event at the first RAT. The message may trigger a handover event of the UE at the second RAT. In some examples, the instructions may also be executable by the processor to implement one or more aspects of the method for wireless communication described above with respect to the third set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present specification describes the management of wireless communications by modifying handover or reselection procedures for a UE in communication with network equipment (e.g., a base station, access point, etc.). When the UE and network equipment use an aggregation or coupling of multiple radio access technologies (RATs), the coupling of the RATs may affect handover or reselection procedures for one or both RATs.

For example, a UE may aggregate a cellular wireless wide area network (WWAN) carrier and a wireless local area network (WLAN) carrier to communicate with network equipment having collocated or non-collocated WWAN base station and WLAN access point elements. The UE or network equipment may identify a coupling between the WWAN and WLAN carriers in the communication between the UE and the network equipment, and update a handover or reselection policy for the UE or network equipment. For example, the UE or network equipment may be reconfigured based on the identified coupling such that a handover event (e.g., the detected occurrence or imminence of a handover) on the WWAN side and/or a message related to a WWAN handover triggers a handover on the WLAN side.

In additional or alternative examples, the UE or network equipment may be reconfigured based on the identified coupling to suppress a default handover procedure for the WWAN or WLAN RAT and/or to modify a set of measurement events triggering the UE to obtain channel measurements or provide measurement reports to the network equipment.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1A:
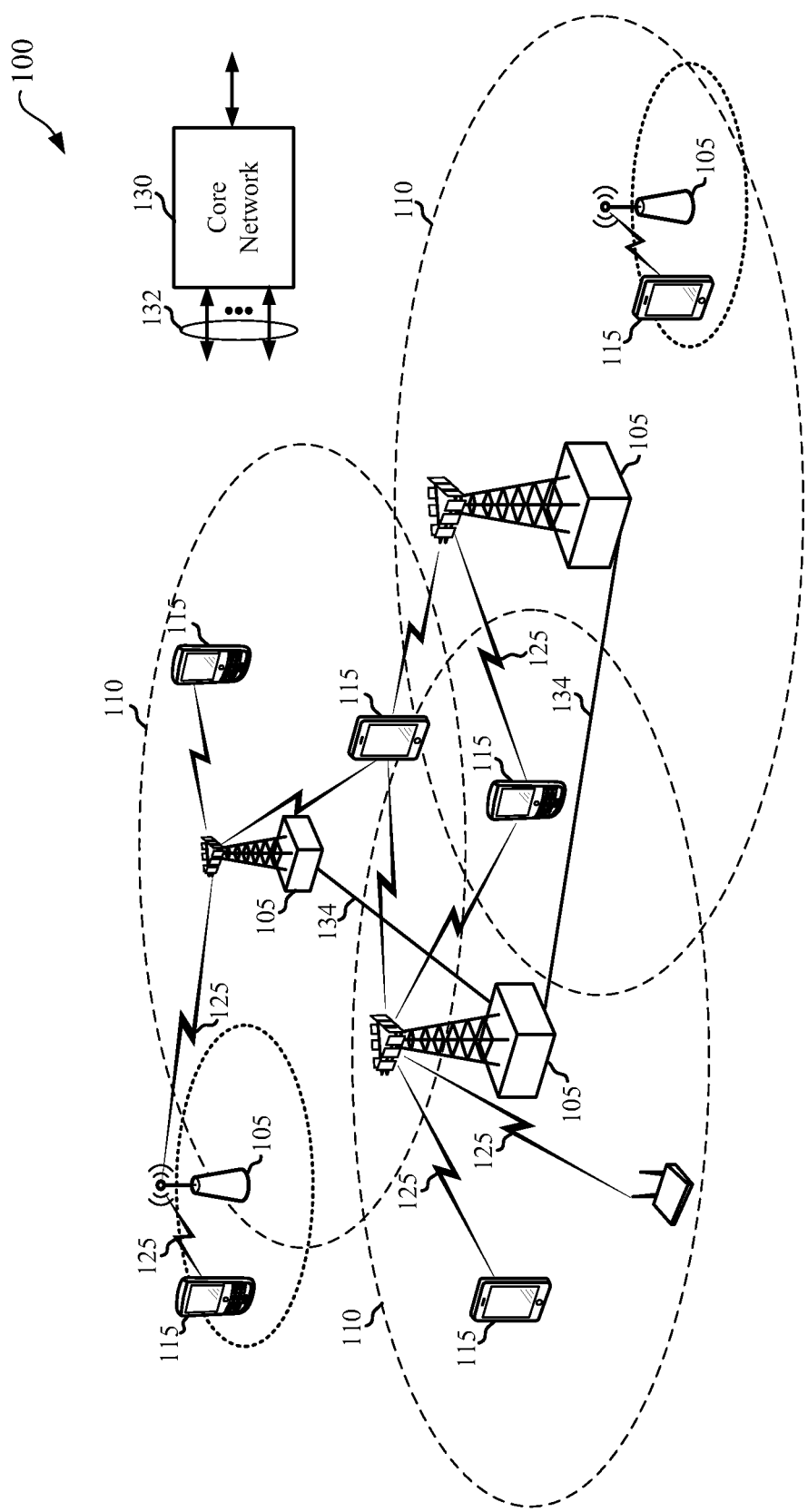
FIG. 1A shows a block diagram of a wireless communications system in accordance with various embodiments.

Referring first to FIG. 1A, a diagram illustrates an example of a wireless communications system 100. The system 100 may include base station network equipment 105, communication User Equipment (UEs) 115, and a core network 130. The base station network equipment 105 may support a number of cells for communicating with the UEs 115 and may be coupled to a core network 130. Base station network equipment 105 may communicate control information and/or user data with the core network 130 through backhaul links 132. In embodiments, the base station network equipment 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base station network equipment 105 may wirelessly communicate with the UEs 115 via one or more base station antennas. Each of the base station network equipment 105 sites may provide communication coverage for a respective geographic area 110. In some embodiments, base station network equipment 105 may be referred to as simply a base station, a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The coverage area 110 for a base station network equipment may be divided into sectors making up only a portion of the coverage area (not shown). The system 100 may include base station network equipment 105 of different types (e.g., macro, micro, and/or pico base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe base station network equipment 105 and mobile devices, respectively. The system 100 may be a Heterogeneous LTE/LTE-A network in which different types of eNBs provide coverage for various geographical regions. For example, each eNB 105 may operate as a macro cell, a pico cell, a femto cell, and/or other types of cell or power classifications. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and may provide restricted access to UEs having an association with the femto cell (e.g., UEs in a closed subscriber group (CSG), UEs for users in the home, and the like), open access, or hybrid access. An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2 interface, etc.) and/or via backhaul links 132 (e.g., through core network 130). The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless network 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The transmission links 125 shown in network 100 may include uplink (UL) transmissions from a UE 115 to a base station network equipment 105, and/or downlink (DL) transmissions, from a base station network equipment 105 to a UE 115. The downlink transmissions may also be called forward link transmissions while the uplink transmissions may also be called reverse link transmissions.

In certain examples, heterogeneous radio access technologies (RAT) may be available within the wireless communications system such that the UEs 115 may access the core network 130 over an aggregation of different RAT carriers. For example, one or more base station network equipment 105 of the system 100 may include both WWAN base station WLAN access point elements. In certain examples, a base station network equipment 105 may include an LTE eNBs element collocated with a WLAN access point element. Thus, a multi-RAT base station network equipment 105 may implement both an eNB 105 and a WLAN access point 105 to communicate with a UE 115 over separate LTE and WLAN carriers. Additionally or alternatively, certain base station network equipment 105 may include either WWAN base station or WLAN access point elements—e.g., the elements may not be collocated—and a UE 115 may communicate with both WWAN and WLAN elements. Thus, as used here, base station network equipment 105 may include either WWAN elements or WLAN elements, or both.

Certain base station network equipment 105 may support WWAN-WLAN carrier aggregation such that the base station network equipment 105 may communicate simultaneously with one or more UEs over both the WWAN and WLAN carriers. Such base station network equipment 105 may have a single Radio Link Control (RLC) layer providing packets to be transmitted to the UE 115, and receiving packets from the UE 115, over both the WWAN and the WLAN RATs. Thus, network traffic communicated between the UE 115 and the network equipment 105 over both RATs may be supported by at least one common bearer (e.g., an evolved packet core (EPC) bearer set up on the WWAN side). As will be described in more detail with respect to the following Figures, a UE 115 and/or base station network equipment 105 supporting the aggregation of WWAN and WLAN RAT carriers may be capable of identifying a coupling and/or aggregation between the RATs and adapting handover or reselection procedures at the UE 115 and/or base station network equipment 105 based on the identified coupling.

Figure 1B:
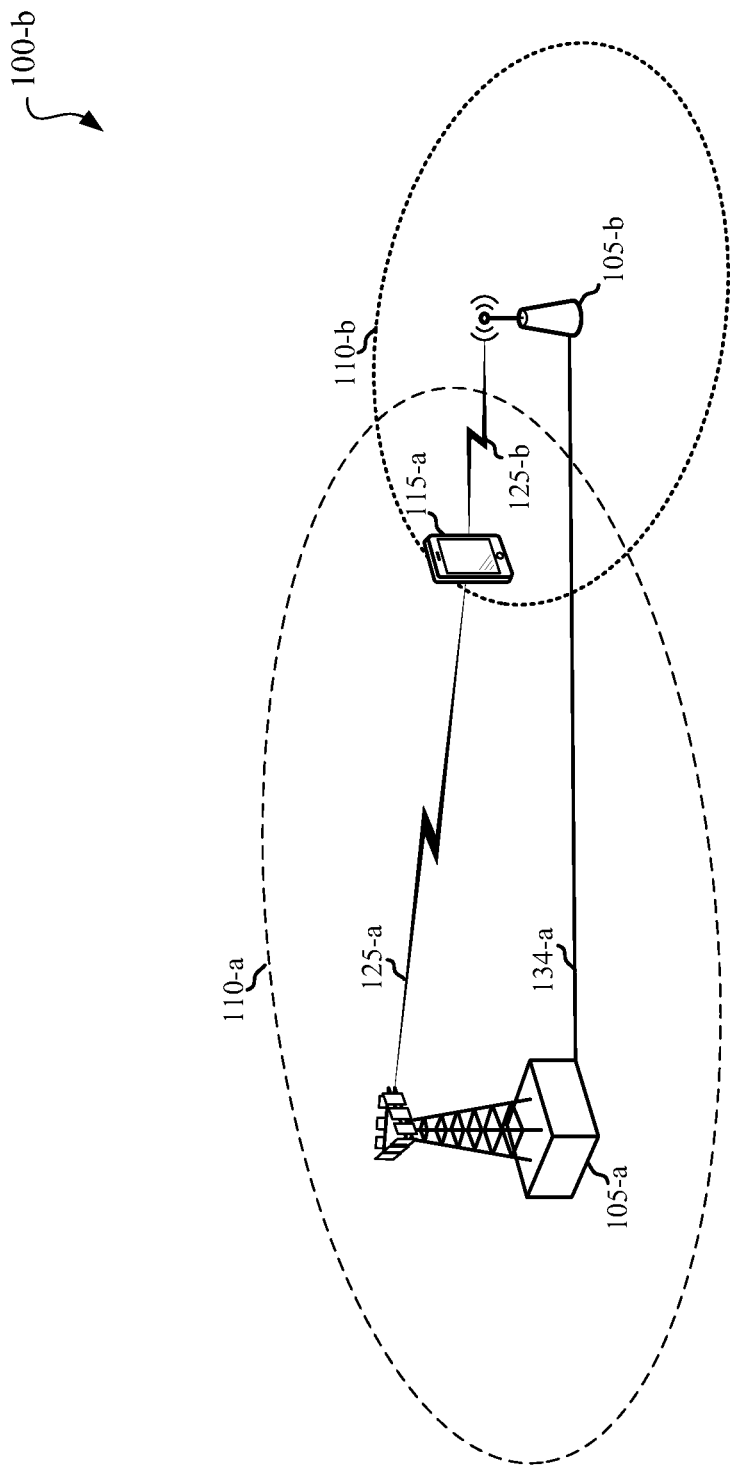
FIG. 1B shows a block diagram that illustrates an example of non-collocated RATs in accordance with various embodiments.

FIG. 1B shows a diagram that illustrates an example of a system 100-*b* with non-collocated network equipment 105 elements. The system 100-*b* may be an example of aspects of the system 100 of FIG. 1A. The system 100-*b* may include a base station network equipment 105-*a* associated with a WWAN RAT and having a coverage area 110-*a*. The system 100-*b* may also include an access point network equipment 105-*b* associated with a WLAN RAT and having a coverage area 110-*b*. The network equipment 105-*a* and 105-*b* may be examples of the network equipment 105 of FIG. 1A.

The system 100-*b* may also include a UE 115-*a*, which may be an example of the UEs 115 of FIG. 1A. The UE 115-*a* may communicate with the network equipment 105-*a* using one or more transmission links 125-a. The UE 115-a may communicate with the network equipment 105-b using one or more transmission links 125-b. In some instances, the UE 115-a may communicate with both the network equipment 105-a and 105-b concurrently. The network equipment 105 may be coupled via a high speed link, such as backhaul link 134-a.

Figure 2A:
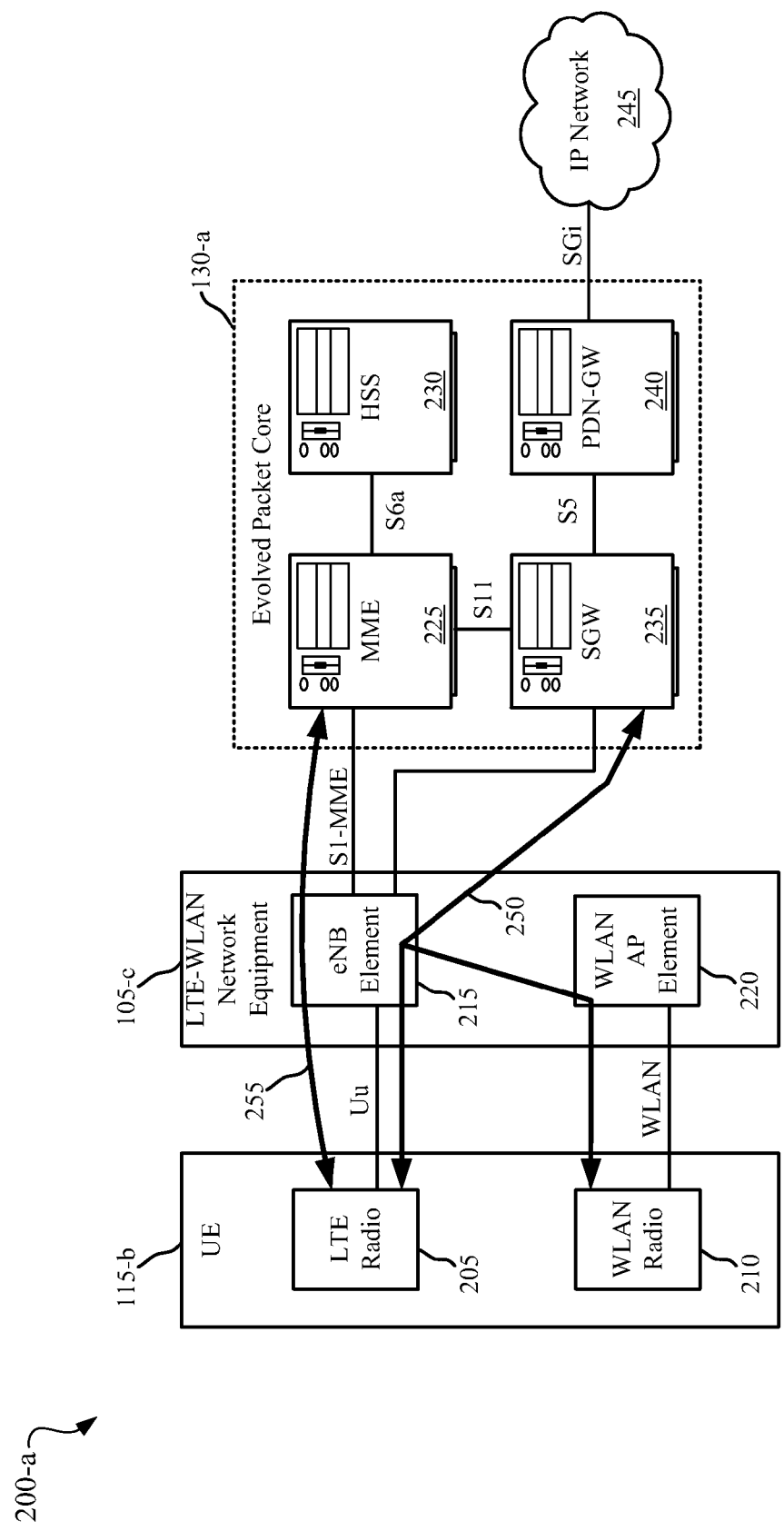
FIG. 2A shows a block diagram of an illustrative wireless communications system that includes an aggregation of multiple RATs to communicate data between a UE and network equipment in accordance with various embodiments.

Referring now to FIG. 2A, a diagram of a wireless communication system 200-a is shown. The wireless communication system 200-a may include a UE 115-b, LTE-WLAN base station network equipment 105-c, an evolved packet core (EPC) 130-a, and an IP network 245 (e.g., the Internet and/or an IP network associated with a cellular provider). The UE 115-b, LTE-WLAN base station network equipment 105-c, and EPC 130-a may be examples of the UE 115, base station network equipment 105, and core network 130 of FIG. 1.

The LTE-WLAN base station network equipment 105-c may combine and connect the functionality of both an LTE eNB and a WLAN access point. Thus, the LTE-WLAN base station network equipment 105-c may include an eNB element 215 and a WLAN access point element 220. The UE 115-c may communicate with the eNB element 215 of the LTE-WLAN base station network equipment 105-c using an LTE radio 205 and the WLAN access point element 220 of the LTE-WLAN base station network equipment using a WLAN radio 210. While the present example is given in the context of an aggregation of carriers for LTE and WLAN RATs and an evolved packet core 130-a, it will be understood that these principles may be applied to aggregations of carriers for other types of RATs and using other types of core networks 130.

The eNB and WLAN access point elements 215, 220 may be capable of providing the UE 115-b with access to the evolved packet core 130-a using the aggregation of carriers for the different RATs. Specifically, the eNB element 215 of the LTE-WLAN base station network equipment 105-c may provide access to the evolved packet core 130-a over a Uu interface of LTE or LTE-Advanced access technology defined by the 3rd Generation Partnership Project (3GPP), and the WLAN access point element 220 of the LTE-WLAN base station network equipment 105-c may provide access to the evolved packet core 130-a over WLAN access technology defined by the 802.11 standard from the Institute of Electrical and Electronics Engineers (IEEE).

The evolved packet core 130-a may include a mobility management entity 225, a home subscriber server (HSS) 230, a serving gateway (SGW) 235, and a packet data network (PDN) gateway (PDN-GW) 240, as defined by the Evolved Packet System (EPS) architecture standardized by the 3GPP organization. In some examples, one or more of these nodes may be implemented by the same device.

The MME may be the control node that processes the signaling between the UE 115-b and the EPC 130-a. Generally, the MME 225 may provide bearer and connection management. The MME 225 may, therefore, be responsible for idle mode UE tracking and paging, bearer activation and deactivation, and SGW selection for the UE 115-b. The MME 225 may communicate with the eNB element 215 of the LTE-WLAN base station network equipment 105-c over an S1-MME interface. The MME 225 may additionally authenticate the UE 115-b and implement Non-Access Stratum (NAS) signaling with the UE 115-b.

The HSS 230 may, among other functions, store subscriber data, manage roaming restrictions, manage accessible access point names (APNs) for a subscriber, and associate subscribers with MMEs 225. The HSS may communicate with the MME over an S6a interface defined by defined by the Evolved Packet System (EPS) architecture standardized by the 3GPP organization.

All user IP packets transmitted over the LTE RAT may be transferred through the SGW 235, which may be connected to the PDN-GW 240 over an S5 signaling interface and the MME over an S11 signaling interface, and the LTE-WLAN base station network equipment 105-a. The SGW 235 may reside in the user plane and act as a mobility anchor for inter-eNB handovers and handovers between different access technologies. The PDN-GW 240 may provide UE IP address allocation as well as other functions.

The PDN-GW 240 may provide connectivity to one or more external packet data networks, such as IP network 245, over an SGi signaling interface. The IP network 245 may include the Internet, an Intranet, an IP Multimedia Subsystem (IMS), a Packet-Switched (PS) Streaming Service (PSS), and/or other types of PDNs.

In the present example, user plane data 250 between the UE 115-b and the EPC 130-a may traverse the same set of one or more EPC bearers, irrespective of whether the traffic flows over the LTE or WLAN radio link. Signaling or control plane data 255 related to the set of one or more EPC bearers may be transmitted between the LTE radio 205 of the UE 115-b and the MME 225 of the EPC, by way of the eNB element 215 of the LTE-WLAN base station network equipment 105-c. Thus, a link or coupling between the WLAN radio 210 of the UE 115-b and a WLAN access point element 220 may be used to carry data related to an EPC bearer if the WLAN access point element 220 is collocated or otherwise in high-speed communication with an eNB element 215 handling the signaling data 245 for that bearer. Conversely, if the WLAN access point serving the UE 115-b is not associated or directly coupled with the eNB element 215, traffic sent by the UE 115-b over WLAN may not have a way to reach the bearers of the eNB element 215. Alternatively, there may be a path for WLAN traffic from the UE 115-b to the bearers of the eNB element 215, but such a path may include a slow backhaul between the WLAN access point serving the UE 115-b and the eNB element 215, which may cause poor throughput or large delays and result in poor user experience.

For this reason, if the UE 115-b is currently communicating EPC bearer data with an LTE-WLAN base station network equipment 105-c using an aggregation of an LTE carrier and a WLAN carrier, as shown in FIG. 2A, a handover on the LTE side may cause a disruption to the data path on the WLAN side because the bearer may be reconfigured to originate at the target cell of the LTE handover. Accordingly, the UE 115-b or LTE-WLAN base station network equipment 105-c may determine that a detected handover event may affect an ability of the UE 115-b to continue communicating network traffic supported by the same bearer over both the LTE and WLAN RATs. Similarly, a handover on the WLAN side may cause a disruption to the data path on the WLAN side because the bearer may not be available to the target WLAN access point of the WLAN handover.

In either of these cases, traffic related to the EPC bearer sent by the UE over the WLAN link following the handover may be dropped at the WLAN access point, as the bearer may not be available at the WLAN access point currently associated with the UE 115-b without changes to the default handover procedures for the UE 115-b and/or the LTE-WLAN base station network equipment 105-c. This loss of data packets may result in poor user experience. To address these and other issues, the present specification discusses the concept of the UE 115-*b* or LTE-WLAN network equipment 105-*c* adapting a handover and/or reselection procedure for at least one of the WWAN RAT or the WLAN RAT based on the identified coupling or aggregation of the WWAN RAT and the WLAN RAT and, in certain examples, on the determination that a handover of the UE would either prevent the UE from continuing to communicate network traffic supported by the same bearer over both the first RAT and the second RAT.

Figure 2B:
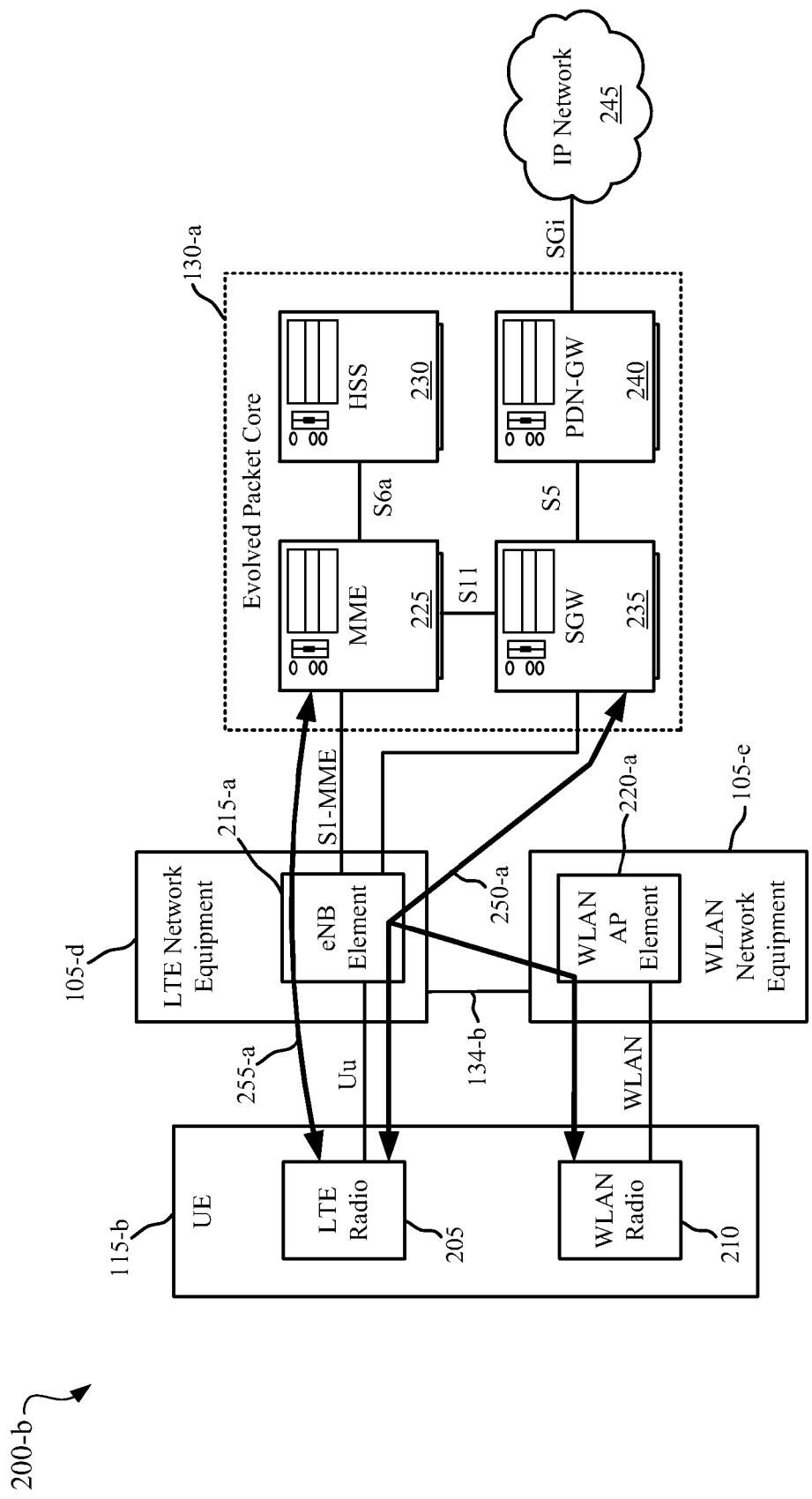
FIG. 2B shows a block diagram of an illustrative wireless communications system that includes a coupling of multiple non-collocated network equipment elements to communicate data between a UE and network equipments in accordance with various embodiments.

Referring now to FIG. 2B, an embodiment of a wireless communication system 200-*b* with non-collocated network equipment 105 elements is shown. The wireless communication system 200-*b* may include a UE 115-*b*, LTE base station network equipment 105-*d*, a WLAN access point network equipment 105-*e*, EPC 130-*a*, and an IP network 245 (e.g., the Internet and/or an IP network associated with a cellular provider). The UE 115-*b*, LTE base station network equipment 105-*d*, WLAN access point network equipment 105-*e*, and EPC 130-*a* may be examples of the UE 115, base station network equipment 105, and core network 130 of FIG. 1A, 1B, or 2A. The eNB element 215-*a* may be a module of an LTE network equipment 105-*d*, and the WLAN access point element 220-*a* may be a module of a WLAN network equipment 105-*e*. The eNB element 215-*a* may be coupled to the WLAN access point element 220-*a* by a high speed link (e.g., backhaul link 134-*b*).

The UE 115-*b* may communicate with the eNB element 215-*a* and the WLAN access point element 220-*a* in a similar manner as described in reference to FIG. 2A above. Likewise communication with the various aspects of the EPC 130-*a* and the IP network 245 may be as described above with respect to FIG. 2A. Accordingly, user plane data 250-*a* between the UE 115-*b* and the EPC 130-*a* may traverse the same set of one or more EPC bearers, irrespective of whether the traffic flows over the LTE or WLAN radio link. Signaling or control plane data 255-*a* related to the set of one or more EPC bearers may be transmitted between the LTE radio 205 of the UE 115-*b* and the MME 225 of the EPC by way of the eNB element 215-*a* of the LTE base station network equipment 105-*d*. The link 134-*b* (e.g., a coupling) between the WLAN radio 210 of the UE 115-*b* and a WLAN access point element 220-*a* may be used to carry data related to an EPC bearer to the eNB element 215-*a* handling the signaling data 245 for that bearer.

Figure 3A:
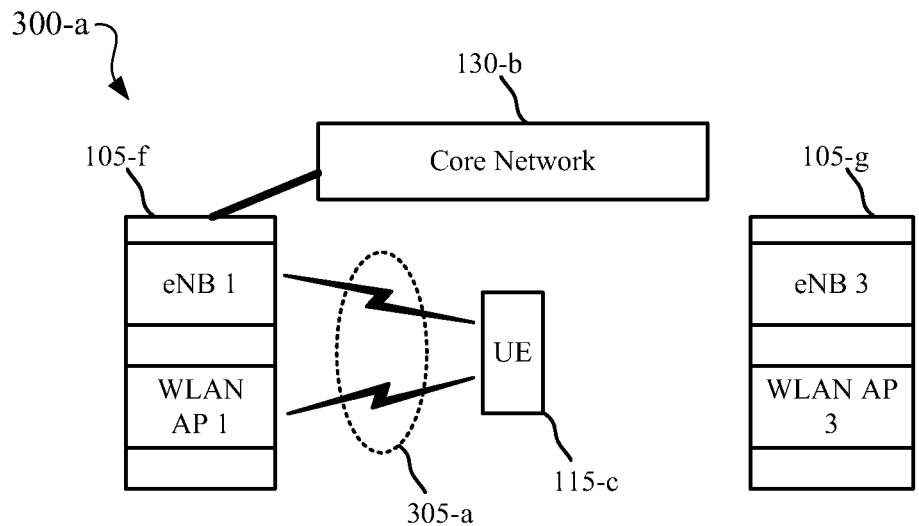
FIGS. 3A-3C show a block diagram of an illustrative wireless communications system at different stages of a handover in accordance with various embodiments.
Figure 3B:
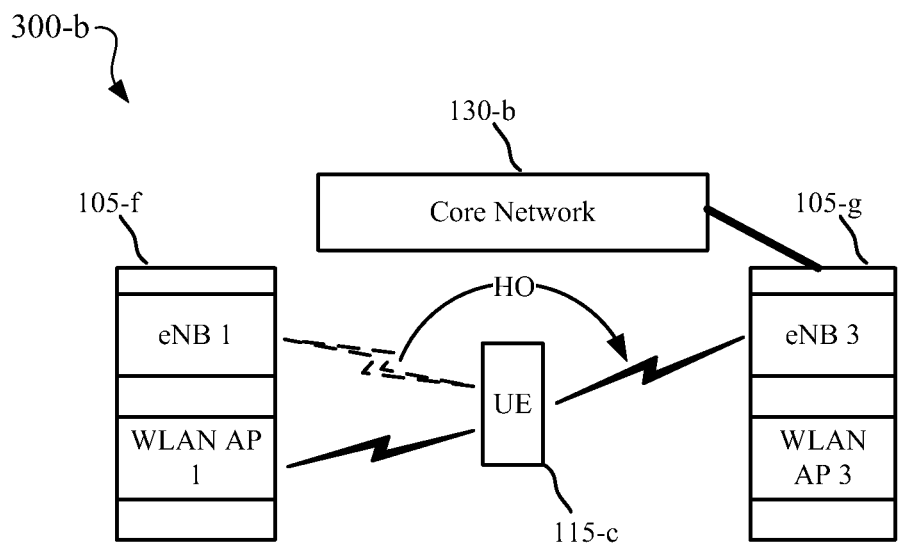
Figure 3C:
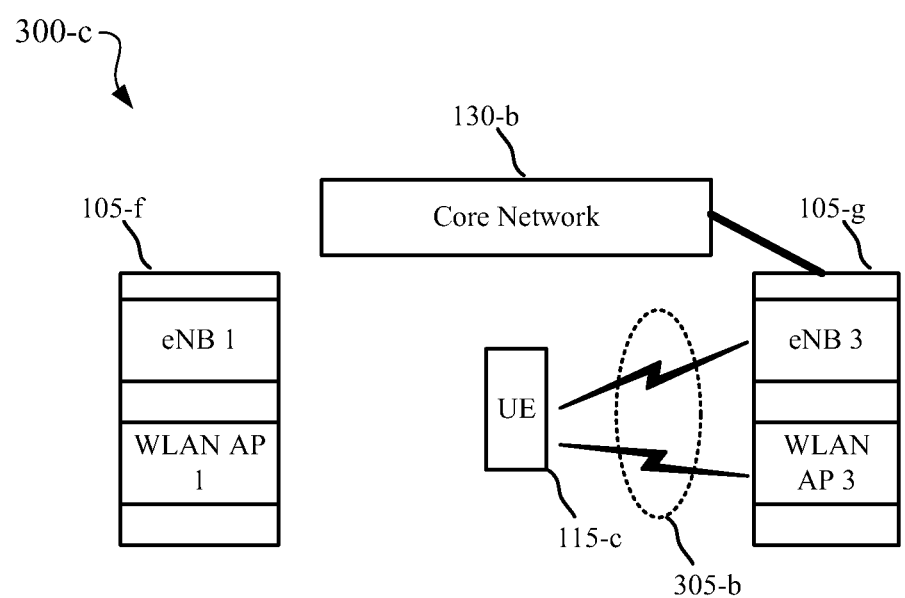

Referring now to FIGS. 3A, 3B, and 3C, block diagrams of a wireless communication system 300 are shown during the process of multiple handover events. The wireless communication system 300 may include a UE 115-*c*, a first LTE-WLAN base station network equipment 105-*f*, a second LTE-WLAN base station network equipment 105-*g*, and a core network 130-*b*. The UE 115-*c* may be an example of one or more of the UEs 115 described above with reference to the previous Figures. The LTE-WLAN base station network equipments 105-*f*, 105-*g* may be examples of one or more of the base station network equipments 105 described above with reference to the previous Figures. The core network 130-*b* may be an example of one or more of the core networks 130 described above with reference to the previous Figures. While the LTE-WLAN base station network equipments 105-*f*, 105-*g* are shown with collocated eNB and WLAN AP elements, those skilled in the art will recognize that network equipment 105 elements may be non-collocated as well—e.g., as described above with reference to FIG. 2B.

Referring specifically to FIG. 3A, before a handover event occurs, the UE 115-*c* may communicate with an eNB 1 element and a WLAN access point 1 element of the first LTE-WLAN base station network equipment 105-*f*. The UE 115-*c* may communicate data supported by the same one or more EPC bearers over both LTE and WLAN RATs according to a coupling 305-*a* or aggregation of at least one LTE carrier with at least one WLAN carrier. As discussed above, the EPC bearer(s) may be set up at the eNB 1 element of the first LTE-WLAN base station network equipment 105-*f* such that control signaling related to the EPC bearer(s) may be communicated between UE 115-*c* and the core network 130-*b* using the LTE RAT, while user plane data related to the EPC bearer(s) may be communicated between the UE 115-*c* and the core network 130-*b* using the LTE and/or WLAN RATs.

The UE 115-*c* or the first LTE-WLAN base station network equipment 105-*f* may identify the coupling 305-*a* or aggregation of the LTE RAT and the WLAN RAT and modify a default procedure for handing over the UE from the LTE. In certain examples, the UE 115-*c* or LTE-WLAN base station network equipment 105-*f* may identify the coupling 305-*a* or aggregation between the two RATs based on a determination that network traffic communicated between the UE 115-*c* and the first network equipment 105-*f* over both the LTE RAT and the WLAN RAT is supported by or channeled through at least one common bearer. Additionally or alternatively, the UE 115-*c* may identify the coupling 305-*a* between the RATs based on a message received from the LTE-WLAN base station network equipment 105-*f* informing the UE 115-*c* of the coupling 305-*a*. This message may be a unicast message or a broadcast message.

Upon identifying the coupling 305-*a* or aggregation of the RATs, the UE 115-*c* or LTE-WLAN base station network equipment 105-*f* may determine that a handover of the UE 115-*c* on one of the RATs would affect an ability of the UE to continue communicating network traffic supported by the same bearer over the aggregation of the RATs at a current rate of data transmission. Based on this determination and the identified relationship between the RATs, the UE 115-*c* and/or LTE-WLAN base station network equipment 105-*f* may determine that coordinated handovers between the RATs may be appropriate to ensure that the cellular and WLAN connections of the UE 115-*c*, to the extent possible, are able to maintain at least the current rate of data transmission even after handover is performed. In some instances, maintaining the current rate of data transmission may be helped by performing coordinated handovers when the target WWAN and WLAN connections of the UE 115-*c* after handover are handled by the same network equipment 105-*g* or when there is minimal delay caused by non-collocated WLAN and WWAN elements, for example. Accordingly, the UE 115-*c* and/or LTE-WLAN base station network equipment 105-*f* may determine to adapt a handover or reselection procedure for at least one of the RATs.

In certain examples, the reselection or handover procedures may be modified by the UE 115-*c* or the LTE-WLAN base station network equipment 105-*f* configuring the UE 115-*c* to initiate a handover event at the second RAT in response to a detection of a handover event at a first RAT. The handover event at the first RAT may be initiated by the UE 115-*c* or by the LTE-WLAN base station network equipment 105-*f*, and the handover event may be detected by the UE 115-*c* or reported to the UE by the LTE-WLAN base station network equipment 105-*f*.

In certain examples, the reselection or handover procedures may be modified by the UE 115-*c* or the LTE-WLAN base station network equipment 105-*f* UE 115-*c* configuring the UE 115-*c* to trigger a handover at the one of the RATs in response to a determination that a handover of the UE 115-*c* has occurred or is imminent at the other one of the RATs, and that the target of the WWAN handover satisfies at least one predetermined criterion. In one example, the UE 115-*c* may be reconfigured to trigger a handover at the WLAN RAT in response to a determination that a WWAN handover has occurred or will occur if a target cell of the WWAN handover has collocated WWAN and WLAN elements that are capable of maintaining or reestablishing the aggregation of the two RATs. That is, there may be no need to initiate a WLAN handover if the target cell of the WWAN handover does not have a coupled WLAN AP that supports WWAN-WLAN aggregation.

In another example, the UE 115-*c* may be reconfigured to trigger a handover at the WWAN RAT in response to a determination that a WLAN handover has occurred or will occur if a target access point (e.g., WLAN AP2 of network equipment 105-*g*) of the WLAN handover is coupled with a different WWAN element (e.g., eNB2 of network equipment 105-*g*) than the WWAN element (e.g., eNB1 of network equipment 105-*f*) coupled with the current access point (e.g., WLAN AP1 of network equipment 105-*f*) of the UE 115-*c*. That is, there may be no need to initiate a WWAN handover if the target access point of the WLAN handover is already coupled with the current WWAN serving cell of the UE 115-*c*.

In additional or alternative examples, the reselection or handover procedures may be modified by the UE 115-*c* or the LTE-WLAN base station network equipment 105-*f* configuring the UE 115-*c* to initiate a handover event at a second RAT based on a message received from the LTE-WLAN base station network equipment 105-*b* over a first RAT or the second RAT. For example, the UE 115-*c* may configure itself to trigger a handover on the WLAN side in response to a message received over the WLAN side from the first LTE-WLAN base station 105-*f* indicating a target (e.g., the eNB2 element of the second LTE-WLAN base station network equipment 105-*g*) of a WWAN handover about to occur at the UE 115-*c*. This message may be transmitted to the UE 115-*c* over WLAN by the first LTE-WLAN base station 105-*f* in response to the first LTE-WLAN base station 105-*f* determining that the WWAN handover of the UE 115-*c* is about to occur. In certain examples, the message may include an instruction to the UE 115-*c* to perform a WLAN handover to a target WLAN access point coupled with the indicated target of the WWAN handover.

In additional or alternative examples, the reselection or handover procedures may be modified by the UE 115-*c* or the LTE-WLAN base station network equipment 105-*f* in response to the determined coupling between the RATs and an additional determination that a target of a handover for one of the RATs satisfies at least one predetermined criterion. The at least one predetermined criterion may be dynamically adjusted according to the state (e.g., amount of data to send, QoS or service requirements of data to send) of the UE 115-*c*. In one example, the UE 115-*c* may identify a potential target access point on the WLAN side that supports the WWAN-LTE aggregation in place, but offers the WWAN-LTE connectivity service independently from the current WWAN-LTE connectivity of the UE 115-*c*. In this case, the UE 115-*c* may choose not to modify its reselection or handover procedures based on the coupling 305, as a handover on the WLAN side could disrupt IP continuity with or without the modification to the reselection or handover procedures.

In additional or alternative examples, the reselection or handover procedures may be modified by the UE 115-*c* or the LTE-WLAN base station network equipment 105-*f* suppressing a default handover procedure for one of the RATs. In additional or alternative examples, the UE 115-*c* or the LTE-WLAN base station network equipment 105-*f* may add, modify, or remove measurement events from a set of measurement events that trigger the UE 115-*c* to obtain channel measurements or provide measurement reports to the LTE-WLAN base station network equipment 105-*f*. Because handovers or reselection procedures initiated by the LTE-WLAN base station network equipment 105-*f* may be in response to measurement reports received from the UE 115-*c*, the modification of the measurement events triggering the performance of measurements or the provision of measurement reports may modify the reselection or handover procedures.

Referring now specifically to FIGS. 3B and 3C, an example is shown in which the handover procedures of the UE 115-*c* have been adapted, in response to the identified coupling 305-*a* between the LTE WWAN and WLAN RATs, to cause the UE 115-*c* to initiate a WLAN handover of the UE 115-*c* in response to an LTE handover of the UE 115-*c*. As shown in FIG. 3B, the LTE connection of the UE 115-*c* may be handed over from the eNB 1 element of the first LTE-WLAN base station network equipment 105-*f* to the eNB 2 element of the second LTE-WLAN base station network equipment 105-*g*. In response to detecting the occurrence or imminence of this handover, the UE 115-*c* may determine that the eNB 2 element of the second LTE-WLAN base station network equipment 105-*g* is coupled with the WLAN AP 2 element of the second LTE-WLAN base station network equipment 105-*g*, and that the second LTE-WLAN base station network equipment 105-*g* supports the coupling and aggregation of LTE and WLAN carriers. Based on the adapted handover procedures in place at the UE 115-*c* and these determinations, the UE 115-*c* may initiate a handover of its WLAN connection from the WLAN AP 1 element of the first LTE-WLAN base station network equipment 105-*f* to the WLAN AP 2 element of the second LTE-WLAN base station network equipment 105-*g*, as shown in FIG. 3C. Once this second handover is complete, the coupling 305-*b* of the LTE and WLAN carriers may be restored.

In certain examples, the UE 115-*c* may transmit and receive WLAN traffic associated with an EPC bearer over a first WLAN port, and other WLAN traffic (e.g., direct Internet or LAN connectivity) over a second WLAN port. In such cases, at least the functionality of a) identifying a coupling between the first RAT and the second RAT in the communication between the UE and b) the network equipment and adapting at least one of a reselection procedure or a handover procedure for one or more of the RATs based on the identified coupling may be performed for the first port and not the second port. That is, the above described functionality may, in certain examples, only apply to EPC-bearer related WLAN traffic between the UE 115-*c* and the core network 130-*b*, but not other WLAN traffic of the UE 115-*c*. Thus, where WLAN traffic is associated with a set of ports at the UE 115-*c*, the network traffic routing may be adapted for only a subset of the set of ports in response to the handover event.

Figure 4:
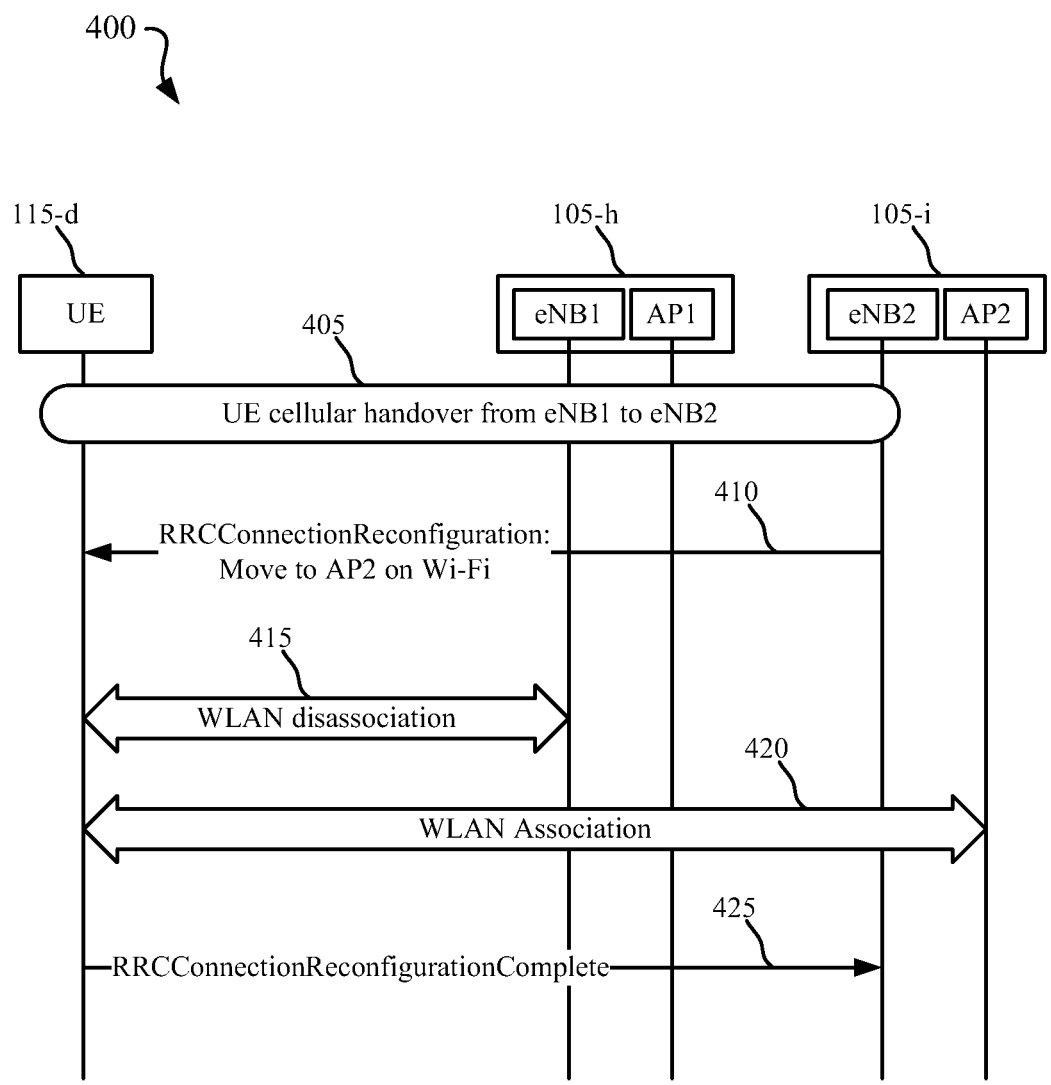
FIG. 4 shows a diagram of an illustrative process for handover modification in a wireless system in accordance with various embodiments.

Referring now to FIG. 4, an example is shown of a process 400 of dynamically adapting a handover procedure based on an identified coupling between WWAN (e.g., LTE) and WLAN carriers. The process 400 is illustrated in the context of a UE 115-*d*, a first LTE-WLAN base station network equipment 105-*h*, and a second LTE-WLAN base station network equipment 105-*i*. The UE 115-*d* and network equipment 105-*h*, 105-*i* may be examples of one or more of the UEs 115 and network equipment 105 described above with reference to previous Figures.

The process 400 may begin with the occurrence of a cellular WWAN handover 405 of the UE 115-*d* from an eNB1 element of the first LTE-WLAN base station network equipment 105-*h* to an eNB2 element of the second LTE-WLAN base station network equipment 105-*i*. This handover may be initiated by the UE 115-*d* or by the first LTE-WLAN base station network equipment 105-*h*. In examples where the first LTE-WLAN base station network equipment 105-*h* initiates the handover, the first LTE-WLAN base station network equipment 105-*h* may transmit a message to the UE 115-*d* informing the UE 115-*d* of the occurrence or imminence of the handover.

Upon completion of the handover, the second LTE-WLAN base station network equipment 105-*i* may determine that UE 115-*d* has coupled LTE and WLAN RATs in a carrier aggregation, determine that the AP2 element of the second LTE-WLAN base station network equipment 105-*i* supports this aggregation, and update its handover procedures to attempt a handover of the WLAN side of the UE 115-*d* to the AP2 element of the second LTE-WLAN base station network equipment 105-*i*. The second LTE-WLAN base station network equipment 105-*i* may accordingly transmit a radio resource control (RRC) layer message to the UE 115-*d* requesting the WLAN handover of the 115-*d*. Alternatively, the second LTE-WLAN base station network equipment 105-*i* may simply transmit a report of the handover and the capabilities of the second LTE-WLAN base station network equipment 105-*i*.

The UE 115-*d* may be operating adapted handover procedures based on the coupling of the LTE and WLAN RATs such that, based on the message 410 received from the second LTE-WLAN base station network equipment 105-*i*, the UE 115-*d* disassociates 415 itself from the WLAN AP1 element of the first LTE-WLAN base station network equipment 105-*h*, associates 420 itself with the WLAN AP2 element of the second LTE-WLAN base station network equipment 105-*i*, and transmits an RRC message 425 to the second LTE-WLAN base station network equipment 105-*i* indicating that the WLAN handover is complete. The coupling of the LTE and WLAN RATs discussed above may be restored following completion of both handovers.

Figure 5:
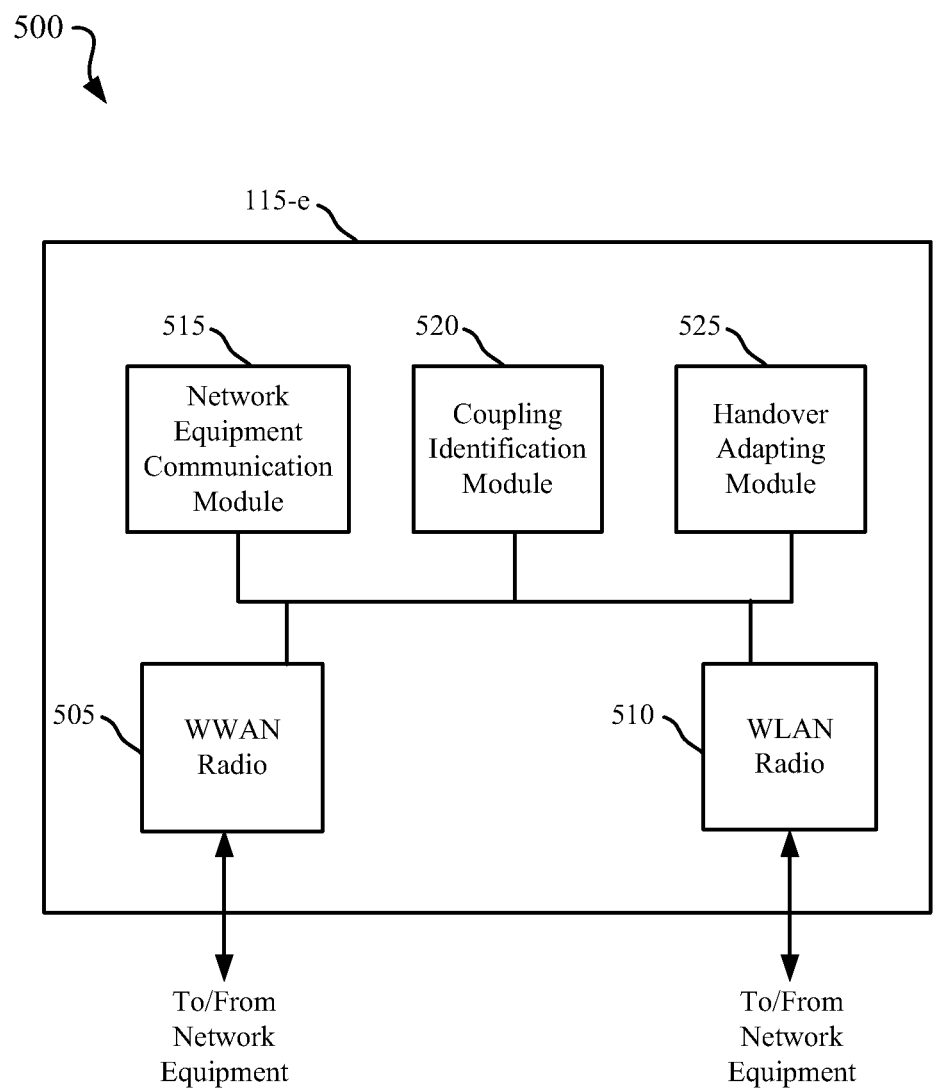
FIG. 5 shows a block diagram of an illustrative UE in accordance with various embodiments.

Referring now to FIG. 5, a block diagram 500 of an example multi-mode UE 115-*e* is shown. The UE 115-*e* may be an example of one or more of the UEs 115 described above with reference to the previous Figures. The UE 115-*e* may include a WWAN radio 505, a WLAN radio 510, a network equipment communication module 515, a coupling identification module 520, and a handover adapting module 525. Each of these components may be in communication, directly or indirectly.

The WWAN radio 505 may be configured to communicate with network equipment (e.g., network equipment 105 of the previous Figures) over one or more carriers of a cellular WWAN RAT (e.g., LTE/LTE-A, eHRPD, EV-DO, 1x/HRPD, etc.). The WLAN radio 510 may be configured to communicate with network equipment over one or more carriers of a WLAN RAT (e.g., IEEE 802.11, etc.).

The network equipment communication module 515 may be configured to establish communication between the UE and network equipment over the WWAN RAT and the WLAN RAT. In particular, the network equipment communication module 515 may coordinate and schedule the communication of network traffic supported by the same EPC bearer or set of EPC bearers over the WWAN RAT and the WLAN RAT according to an aggregation or coupling of at least one WWAN carrier with at least one WLAN carrier.

The coupling identification module 520 may be configured to identify the coupling or aggregation between the WWAN RAT and the WLAN RAT in the communication between the UE 115-*e* and the network equipment. The coupling identification module 520 may infer the coupling based on its own operations or receive notification of the coupling in a message from the network equipment. In certain examples, the coupling identification module 520 may identify a carrier aggregation of at least one carrier of the WWAN RAT with at least one carrier of the WLAN RAT. In additional or alternative examples, the coupling identification module 520 may identify the coupling of the WWAN RAT and the WLAN RAT based on a determination that the network equipment includes collocated wide area network (WAN) and wireless area network (WLAN) elements. In additional or alternative examples, the coupling identification module 520 may identify the coupling of the WWAN RAT and the WLAN RAT based on a unicast message received from the network equipment over one of the RATs, the message indicating the coupling between the WWAN RAT and the WLAN RAT. In additional or alternative examples, the coupling identification module 520 may identify the coupling of the WWAN RAT and the WLAN RAT based on a broadcast message received over one of the RATs, the message advertising the coupling between the WWAN RAT and the WLAN RAT.

The handover adapting module 525 may be configured to adapt a reselection procedure or a handover procedure for at least one of the WWAN RAT or the WLAN RAT based on the identified coupling between the WWAN RAT and the WLAN RAT. For example, as discussed in more detail above, the handover procedure may be adapted such that a detected occurrence or imminence of a handover for one of the RATs triggers a handover in the other RAT. The handover adapting module 525 may adapt or modify the handover or reselection procedure of the UE 115-*e* and/or cause the handover or reselection procedures of the network equipment to be adapted based on the identified coupling between the RATs.

Figure 6:
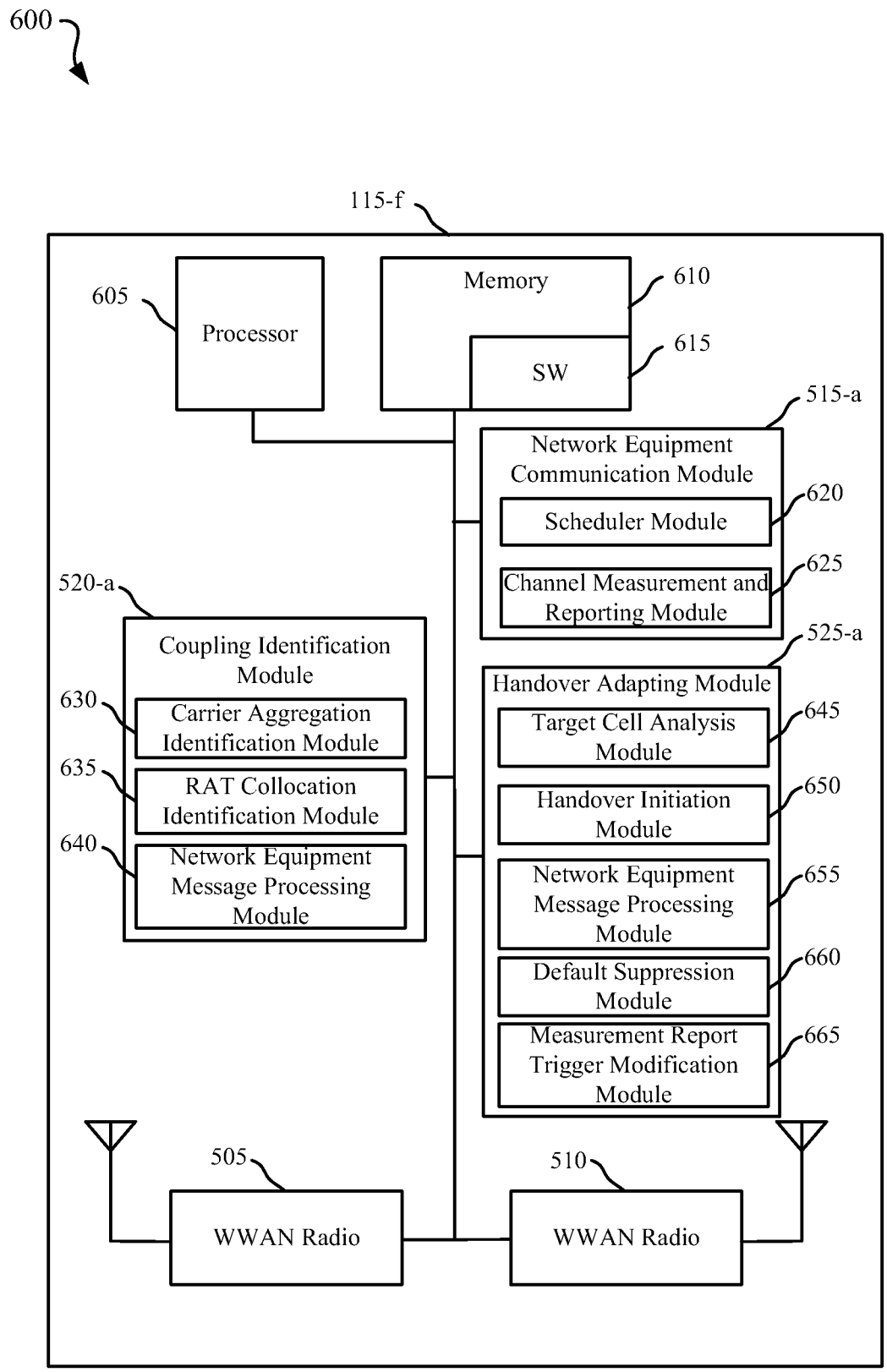
FIG. 6 shows a block diagram of an illustrative UE in accordance with various embodiments.

Referring now to FIG. 6, a block diagram 600 of a more detailed example of a multi-mode UE 115-*f* is shown. The UE 115-*f* may be an example of one or more of the UEs 115 described above with reference to the previous Figures. The UE 115-*f* may include a WWAN radio 505, a WLAN radio 510, a network equipment communication module 515-*a*, a coupling identification module 520-*a*, a handover adapting module 525-*a*, a processor 605, and a memory 610. Each of these components may be in communication, directly or indirectly. In certain examples, the processor 605 may be configured to execute computer-readable program code stored (e.g., software (SW) 615) on the memory 610 to execute one or more of the functions associated with the WWAN radio 505, the WLAN radio 510, the network equipment communication module 515-*a*, the coupling identification module 520-*a*, or the handover adapting module 525-*a*. Additionally or alternatively, one or more functions associated with these components may be implemented by ASICs or other special- or general-purpose hardware arranged and interconnected to perform the functionality associated with each component.

The network equipment communication module 515-*a* may be configured to establish communication between the UE 115-*f* and network equipment over the WWAN RAT using the WWAN radio 505 and over the WLAN RAT using the WLAN radio 510.

The network equipment communication module 515-*a* may include a scheduler module 620 and a channel measurement and reporting module 625. The scheduler module 620 may be configured to receive Radio Link Controller (RLC) packets related to one or more EPC bearers from a unified RLC layer and distribute the RLC packets between the WWAN radio 505 and the WLAN radio 510 for transmission to the network equipment according to the WWAN and WLAN protocols. The scheduler module 620 may implement one or more rules to distribute the RLC packets between the RATs for transmission to the network equipment. The channel measurement and reporting module 625 may measure channel conditions and parameters for one or both of the WWAN RAT or the WLAN RAT and report the measured channel conditions and parameters to the network equipment.

The coupling identification module 520-*a* may be configured to identify a coupling between the WWAN RAT and the WLAN RAT in the communications between the UE 115-*f* and the network equipment. In certain examples, a carrier aggregation identification module 630 of the coupling identification module 520-*a* may determine that network traffic communicated between the UE 115-*f* and the network equipment over at least one carrier of the WWAN RAT and at least one carrier of the WLAN RAT is supported by at least one common bearer.

The coupling identification module 520-*a* may also include a RAT collocation identification module 635 configured to identify the coupling between the WWAN RAT and WLAN RAT based on a determination that the network equipment has collocated wide area network (WAN) and wireless area network (WLAN) elements.

The coupling identification module 520-*a* may further include a network equipment message processing module 640 configured to receive messages from the network equipment and identify, based on the network equipment messages, the coupling between the WWAN RAT and the WLAN RAT. In certain examples, the message from the network equipment may expressly indicate the coupling between the WWAN RAT and the WLAN RAT. Additionally or alternatively, the message from the network equipment may indicate that network equipment has collocated wide area network (WAN) and wireless area network (WLAN) elements. Additionally or alternatively, the message from the network equipment may include other information from which the network equipment message processing module 640 may infer the coupling between the WWAN RAT and the WLAN RAT.

The handover adapting module 525-*a* may be configured to adapt handover or reselection procedures of the UE 115-*f* or the network equipment based on the identified coupling between the WWAN and WLAN RATs. The handover adapting module 525-*a* of the present example may include a target analysis module 645, a handover initiation module 650, a network equipment message processing module 655, a default suppression module 660, and a measurement report trigger modification module 665.

The target analysis module 645 may determine whether to adapt the handover or reselection procedures of the UE 115-*f* or the network equipment based on an analysis of a possible WWAN or WLAN handover target. For example, the target analysis module 645 may determine that a potential or imminent WWAN target cell for the UE 115-*f* does not meet a predetermined criterion (e.g., does not support WWAN-WLAN coupling). Accordingly, the target analysis module 645 may determine to leave a default handover procedure of the UE 115-*f* in place and undisturbed.

If the UE 115-*f* has determined to adapt its reselection or handover procedures based on the coupling, the handover initiation module 650 may adapt the handover or reselection procedures of the UE 115-*f* or network equipment in response to the coupling of the WWAN and WLAN RATs by configuring the UE 115-*f* or network equipment to initiate a handover event at one of the RATs based on a detection of a handover event at the other RAT. For example, the handover initiation module 650 may configure the UE 115-*f* or network equipment to initiate a handover at the WLAN RAT in response to a handover at the WWAN RAT.

In certain examples, the handover initiation module 650 may configure the UE 115-*f* to initiate the handover only in response to a determination that a target WLAN access point associated with the handover event of the WLAN RAT satisfies at least one predetermined criterion. For example, the predetermined criterion may include a determination that network equipment associated with a target cell of the WWAN handover and the target access point of the WLAN supports WWAN-WLAN aggregation according to the principles of the present specification. In additional or alternative examples, the predetermined criterion may include a channel quality or network conditions at the target access point of the WLAN access point handover. In examples where the UE 115-*f* or network equipment is configured to initiate a WWAN handover in response to a detected WLAN handover, the UE 115-*f* or network equipment may be configured to make the WWAN handover contingent on the target of the WWAN handover satisfying at least one predetermined criterion.

The network equipment message processing module 655 may adapt the handover or reselection procedures of the UE 115-*f* or network equipment in response to the coupling of the WWAN and WLAN RATs and in accordance with at least one message received from the network equipment. For example, the network equipment message may be in response to and indicative of the occurrence or imminence of a handover on one of the RATs. In certain examples, the message from the network equipment may indicate a target of the handover.

The handover policy module 660 may adapt the handover or reselection procedures in response to the coupling of the WWAN and WLAN RATs by suppressing one or more default handover or reselection procedures of the UE 115-*f* or the network equipment.

The measurement report trigger modification module 665 may reconfigure the measurement report triggers of the UE 115-*f* by adding, modifying, or removing triggers at the UE 115-*f* associated with generating a measurement report for transmission to the network equipment. In certain examples, the changes to the measurement report triggers may be received at least in part from the network equipment in response to a determination that the RATs are coupled in an aggregation.

Figure 7:
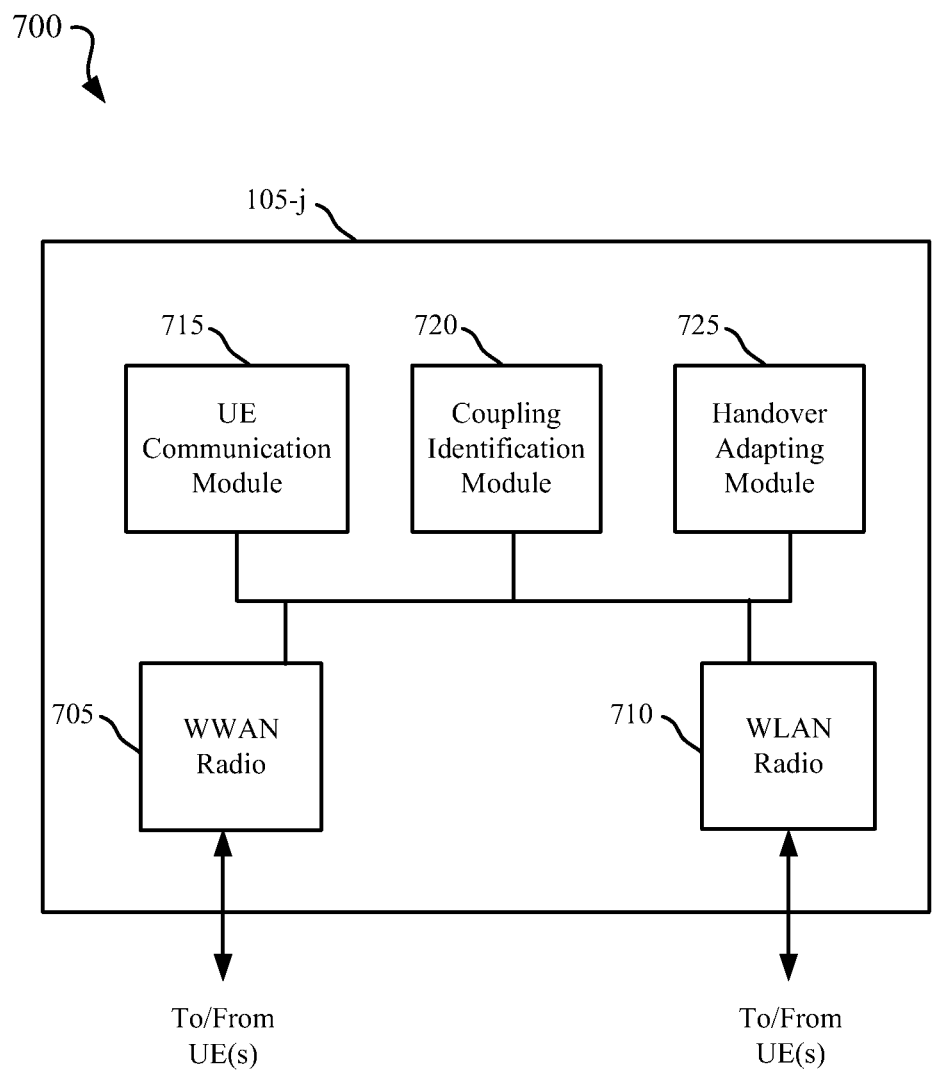
FIG. 7 shows a block diagram of illustrative base station network equipment in accordance with various embodiments.

Referring now to FIG. 7, a block diagram 700 of an example multi-mode network equipment 105-*j* is shown. The network equipment 105-*j* may be an example of one or more of the network equipment 105 described above with reference to the previous Figures. The network equipment 105-*j* may include a WWAN radio 705, a WLAN radio 710, a UE communication module 715, a coupling identification module 720, and a handover adapting module 725. Each of these components may be in communication, directly or indirectly.

The WWAN radio 705 may be configured to communicate with network equipment (e.g., network equipment 105 of the previous Figures) over one or more carriers of a cellular WWAN RAT (e.g., LTE/LTE-A, eHRPD, EV-DO, 1×/HRPD, etc.). The WLAN radio 710 may be configured to communicate with network equipment over one or more carriers of a WLAN RAT (e.g., IEEE 802.11, etc.).

The UE communication module 715 may be configured to establish communication between a UE and the network equipment 105-$j$ over the WWAN RAT and the WLAN RAT. In particular, the UE communication module 715 may coordinate and schedule the communication of network traffic supported by the same EPC bearer or set of EPC bearers over the WWAN RAT and the WLAN RAT according to an aggregation or coupling of at least one WWAN carrier with at least one WLAN carrier.

The coupling identification module 720 may be configured to identify the coupling or aggregation between the WWAN RAT and the WLAN RAT in the communication between the network equipment 105-$j$ and the UE. The coupling identification module 720 may infer the coupling based on the operations of the network equipment 105-$j$ or receive notification of the coupling in a message from the UE.

The handover adapting module 725 may be configured to adapt a reselection or handover procedure for at least one of the WWAN RAT or the WLAN RAT based on the identified coupling between the WWAN RAT and the WLAN RAT. For example, as discussed in more detail above, the handover procedure may be adapted such that a detected occurrence or imminence of a handover for one of the RATs triggers a handover in the other RAT. The handover adapting module 725 may adapt or modify the handover or reselection procedure of the network equipment 105-$j$ and/or cause the handover or reselection procedures of the UE to be adapted based on the identified coupling between the RATs.

Figure 8:
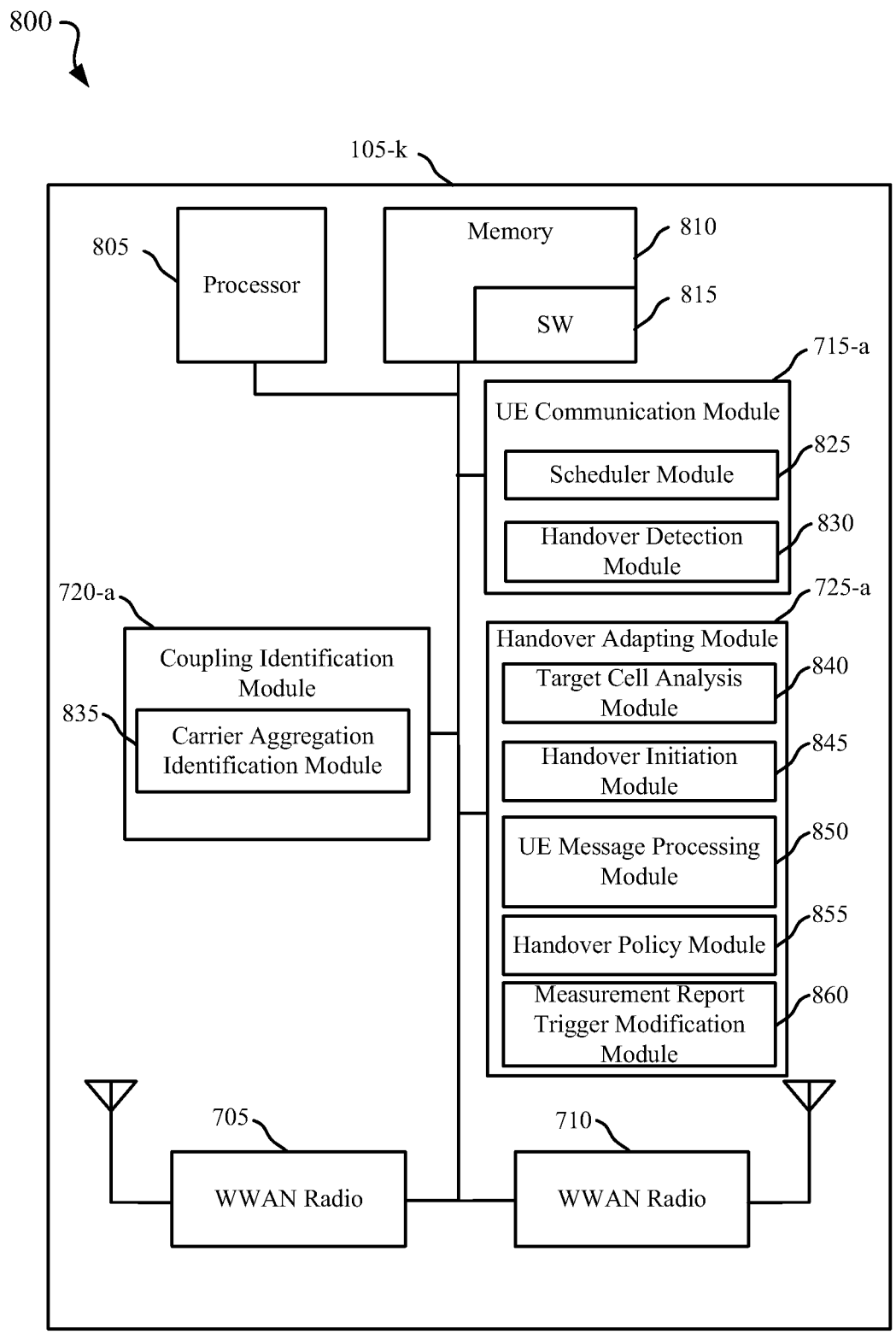
FIG. 8 shows a block diagram of illustrative base station network equipment in accordance with various embodiments.

Referring now to FIG. 8, a block diagram 800 of a more detailed example of a multi-mode network equipment 105-$k$ is shown. The network equipment 105-$k$ may be an example of one or more of the network equipment 105 described above with reference to the previous Figures. The network equipment 105-$k$ may include a WWAN radio 705, a WLAN radio 710, a UE communication module 715-$a$, a coupling identification module 720-$a$, a handover adapting module 725-$a$, a processor 805, and a memory 810 (e.g., including software 815). Each of these components may be in communication, directly or indirectly. In certain examples, the processor 805 may be configured to execute computer-readable program code, or software (SW) 815 stored on the memory 810 to execute one or more of the functions associated with the WWAN radio 705, the WLAN radio 710, the UE communication module 715-$a$, the coupling identification module 720-$a$, or the handover adapting module 725-$a$. Additionally or alternatively, one or more functions associated with these components may be implemented by ASICs or other special- or general-purpose hardware arranged and interconnected to perform the functionality associated with each component.

The UE communication module 715-$a$ may be configured to establish communication between the network equipment 105-$k$ and the UE over the WWAN RAT using the WWAN radio 705 and over the WLAN RAT using the WLAN radio 710.

The UE communication module 715-$a$ may include a scheduler module 825. The scheduler module 825 may be configured to receive Radio Link Controller (RLC) packets related to one or more EPC bearers from a unified RLC layer and distribute the RLC packets between the WWAN radio 705 and the WLAN radio 710 for downlink transmission to the UE according to the WWAN and WLAN protocols. The scheduler module 825 may implement one or more rules to distribute the RLC packets between the RATs.

Additionally or alternatively, the UE communication module 715-$a$ may include a handover detection module 830, which may be configured to detect a handover event, or the imminence of a handover event associated with one RATS. The handover detection module 830 may, in conjunction with additional modules of the network equipment 105-$k$, may be configured to adapt or assist in adapting handover or reselection procedures of the network equipment 105-$k$.

The coupling identification module 720-$a$ may be configured to identify a coupling of the WWAN RAT and the WLAN RAT in the communication between the network equipment 105-$k$ and the UE. For example, a carrier aggregation identification module 835 of the coupling identification module 720-$a$ may determine that network traffic communicated between the network equipment 105-$k$ and the UE over at least one carrier of the WWAN RAT and at least one carrier of the WLAN RAT is supported by at least one common bearer.

The handover adapting module 725-$a$ may be configured to adapt handover or reselection procedures of the network equipment 105-$k$ or UE based on the identified coupling between the WWAN and WLAN RATs. The handover adapting module 725-$a$ of the present example may include a target analysis module 840, a handover initiation module 845, a UE equipment message processing module 850, a handover policy module 855, and a measurement report trigger modification module 860.

The target analysis module 840 may determine whether to adapt the handover or reselection procedures of the network equipment 105-$k$ or the UE based on an analysis of a possible WWAN or WLAN handover target. For example, the target analysis module 840 may determine that a potential or imminent WWAN target cell for the UE does not meet a predetermined criterion (e.g., does not support WWAN-WLAN coupling). Accordingly, the target analysis module 840 may determine to leave a default handover procedure of the UE 115-$f$ in place and undisturbed.

If the network equipment 105-$k$ has determined to adapt its reselection or handover procedures based on the coupling, the handover initiation module 845 may adapt the handover or reselection procedures of the network equipment 105-$k$ or UE in response to the coupling of the WWAN and WLAN RATs by configuring the network equipment 105-$k$ or UE to initiate a handover event at one of the RATs based on a detection of a handover event at the other RAT. For example, the handover initiation module 845 may configure the network equipment 105-$k$ or UE to initiate a handover at the WLAN RAT in response to a handover at the WWAN RAT.

In certain examples, the handover initiation module 845 may configure the network equipment 105-$k$ or UE to initiate the handover only in response to a determination that a target WLAN access point associated with the handover event of the WLAN RAT satisfies at least one predetermined criterion. For example, the predetermined criterion may include a determination that network equipment associated with a target cell of the WWAN handover and the target access point of the WLAN supports WWAN-WLAN aggregation according to the principles of the present specification. In additional or alternative examples, the predetermined criterion may include a channel quality or network conditions at the target access point of the WLAN access point handover. In examples where the network equipment 105-$k$ or UE is configured to initiate a WWAN handover in response to a detected WLAN handover, the network equipment 105-*k* or UE may be configured to make the WWAN handover contingent on the target of the WWAN handover satisfying at least one predetermined criterion.

The UE message processing module 850 may adapt the handover or reselection procedures of the UE 115-*f* in response to the coupling of the WWAN and WLAN RATs and in accordance with at least one message received from the UE. For example, the UE message may be in response to and indicative of the occurrence or imminence of a handover on one of the RATs. In certain examples, the message from the UE may indicate a target of the handover. Additionally or alternatively, the UE message processing module 850 may generate a message to the UE in response to and indicative of the occurrence or imminence of a handover on one of the RATs. In certain examples, the message from the network equipment 105-*k* may indicate a target of the handover.

The handover policy module 855 may adapt the handover or reselection procedures in response to the coupling of the WWAN and WLAN RATs by suppressing one or more default handover or reselection procedures of the of the network equipment 855 or UE.

The measurement report trigger modification module 860 may reconfigure the measurement report triggers of the UE by adding, modifying, or removing triggers at the UE 115 associated with generating a measurement report for transmission to the network equipment. In certain examples, the changes to the measurement report triggers may be received at least in part from the network equipment in response to a determination that the RATs are coupled in an aggregation.

Figure 9:
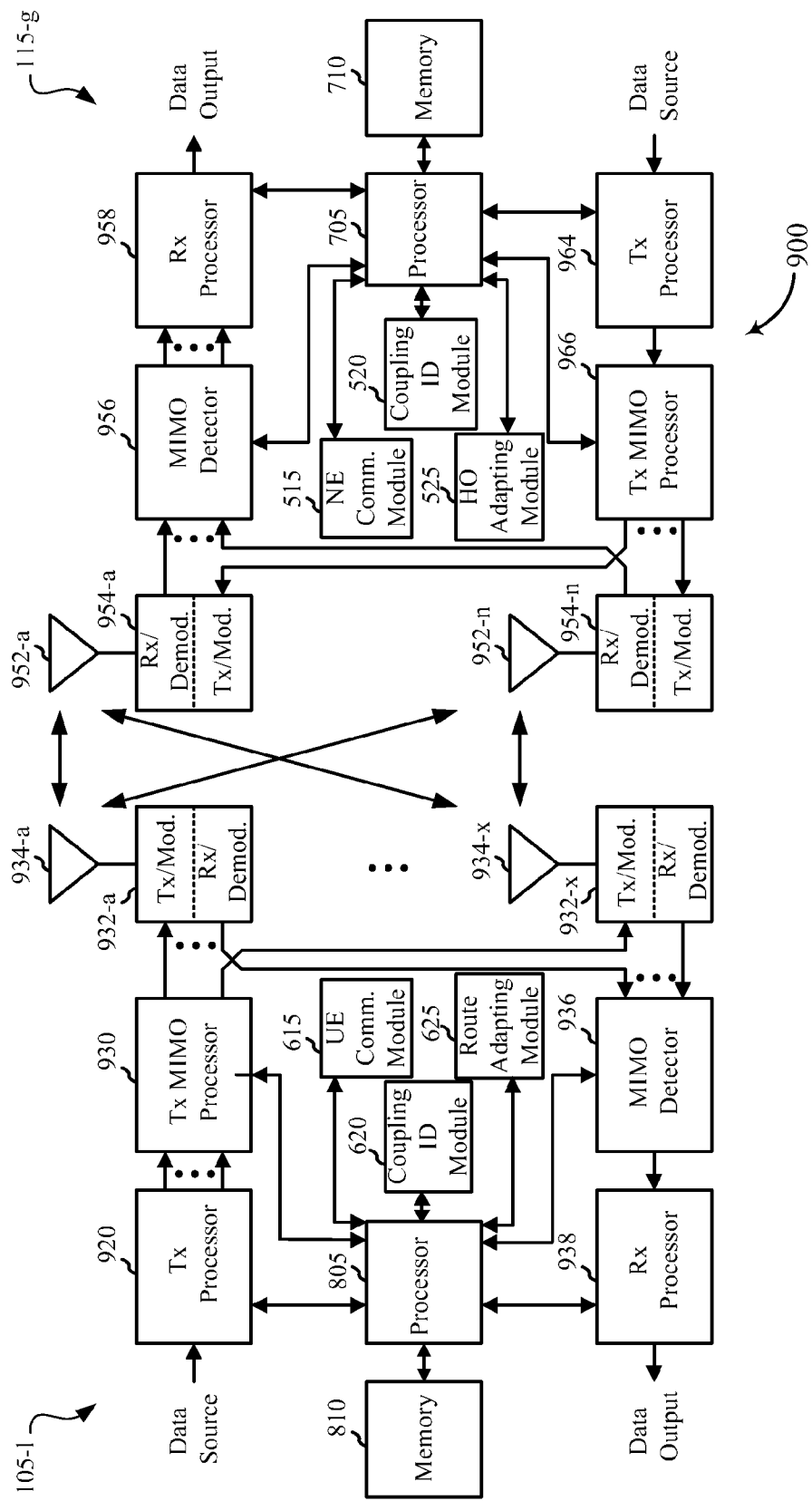
FIG. 9 shows a block diagram of an illustrative wireless communication system in accordance with various embodiments.

FIG. 9 is a block diagram of a MIMO communication system 900 including a network equipment 105-1 and a UE 115-*g*. This system 900 may illustrate aspects of the systems and networks of the previous Figures. The network equipment 105-1 may be equipped with antennas 934-*a* through 934-*x*, and the UE 115-*g* may be equipped with antennas 952-*a* through 952-*n*. In the system 900, the network equipment 105-1 may be able to send data over multiple communication links at the same time. Each communication link may be called a "layer" and the "rank" of the communication link may indicate the number of layers used for communication. For example, in a 2×2 MIMO system where network equipment 105-1 transmits two "layers," the rank of the communication link between the network equipment 105-1 and the UE 115-*g* is two.

At the network equipment 105-1, a transmit processor 920 may receive data from a data source. The transmit processor 920 may process the data. The transmit processor 920 may also generate reference symbols, and a cell-specific reference signal. A transmit (TX) MIMO processor 930 may perform spatial processing (e.g., precoding) on data symbols, control symbols, and/or reference symbols, if applicable, and may provide output symbol streams to the transmit modulators 932-*a* through 932-*x*. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink (DL) signal. In one example, DL signals from modulators 932-*a* through 932-*x* may be transmitted via the antennas 934-*a* through 934-*x*, respectively.

Consistent with the foregoing principles, the network equipment 105-1 may include a processor 805, memory 810, a UE communication module 715, a coupling identification module 720, and a handover adapting module 725. The UE communication module 715 may be configured to establish communication between the UE 115-*g* and the network equipment 105-1 over a first RAT and a second RAT and to identify a coupling between the first RAT and the second RAT in the communication between the UE 115-*g* and the network equipment 105-1. The coupling identification module 720 may be configured to identify a coupling between the first and second RATs, and the handover adapting module 725 may be configured to adapt handover procedures based at least in part on the coupling of the first and second RATs.

At the UE 115-*g*, the UE antennas 952-*a* through 952-*n* may receive the DL signals from the network equipment 105-1 and may provide the received signals to the demodulators 954-*a* through 954-*n*, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all the demodulators 954-*a* through 954-*n*, perform MIMO detection on the received symbols if applicable, and provide detected symbols. A receive processor 958 may process (e.g., demodulate, deinterleave, and decode) the detected symbols, providing decoded data for the UE 115-*g* to a data output, and provide decoded control information to processor 805, or memory 810.

Consistent with the foregoing principles, the UE 115-*g* may include processor 605, memory 610, a network equipment communication module 515, a coupling identification module 520, and a route adapting module 525. The network equipment communication module 515 may be configured to establish communication between the UE 115-*g* and the network equipment 105-1 over a first RAT and a second RAT. The coupling identification module 520 may identify a coupling between the first RAT and the second RAT in the communication between the UE 115-*g* and the network equipment 105-1. The handover adapting module 525 may be configured to adapt network handover procedures based at least in part on the identified handover event.

On the uplink (UL), at the UE 115-*g*, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulators 954-*a* through 954-*n* (e.g., for SC-FDMA, etc.), and be transmitted to the network equipment 105-1 in accordance with the transmission parameters received from the network equipment 105-1.

At the network equipment 105-1, the UL signals from the UE 115-*g* may be received by the antennas 934, processed by the demodulators 932, detected by a MIMO detector 936 if applicable, and further processed by a receive processor. The receive processor 938 may provide decoded data to a data output and to the processor 805. The components of UE 115-*g* may, individually or collectively, be implemented with one or more Application Specific Integrated Circuits (ASICs) adapted to perform some or all of the applicable functions in hardware. Each of the noted modules may be a means for performing one or more functions related to operation of the system 900. Similarly, the components of the network equipment 105-1 may, individually or collectively, be implemented with one or more Application Specific Integrated Circuits (ASICs) adapted to perform some or all of the applicable functions in hardware. Each of the noted components may be a means for performing one or more functions related to operation of the system 900.

Figure 10:
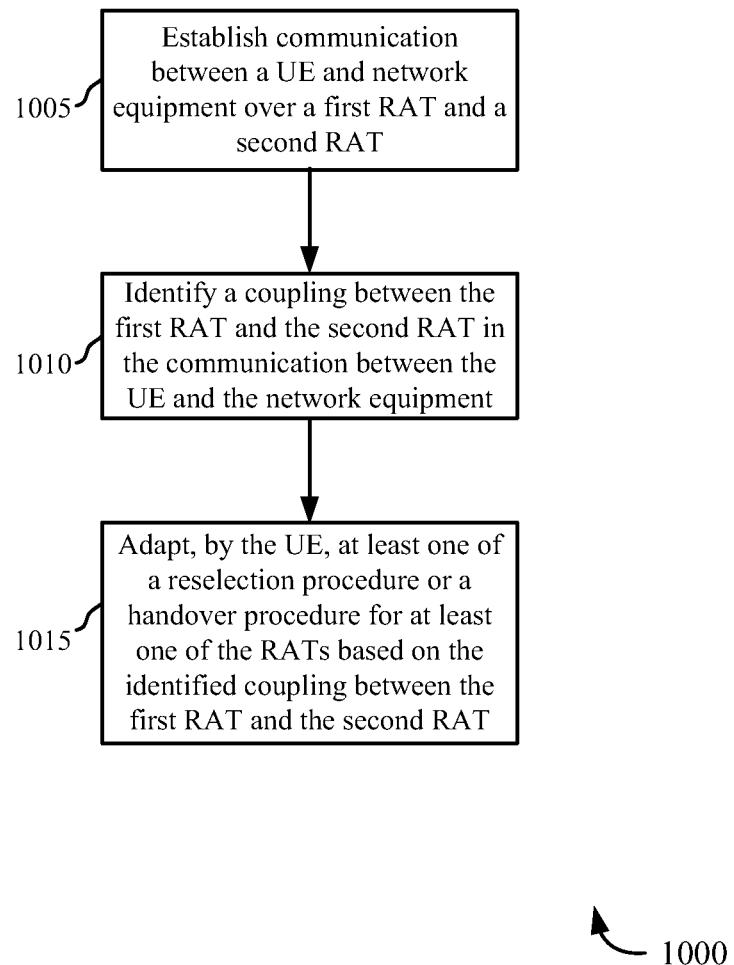
FIG. 10 shows a flowchart of an illustrative method for managing wireless communications in accordance with various embodiments.

FIG. 10 is a flow chart of an illustrative method 1000 of managing wireless communications in a wireless communication system. The method 1000 may be performed, for example, by one or more of the UEs 115 described above with reference to the previous Figures.

At block 1005, the UE may establish communication with network equipment over a first RAT and a second RAT. At block 1010, the UE may identify a coupling between the first RAT and the second RAT in the communication between the UE and the network equipment. For example, the UE may determine that network traffic communicated between the UE and the network equipment over both the first RAT and the second RAT is supported by a common set of one or more bearers. At block 1015, the UE may adapt a reselection or handover procedure based at least in part on the identified coupling between the first and second RATs.

Figure 11:
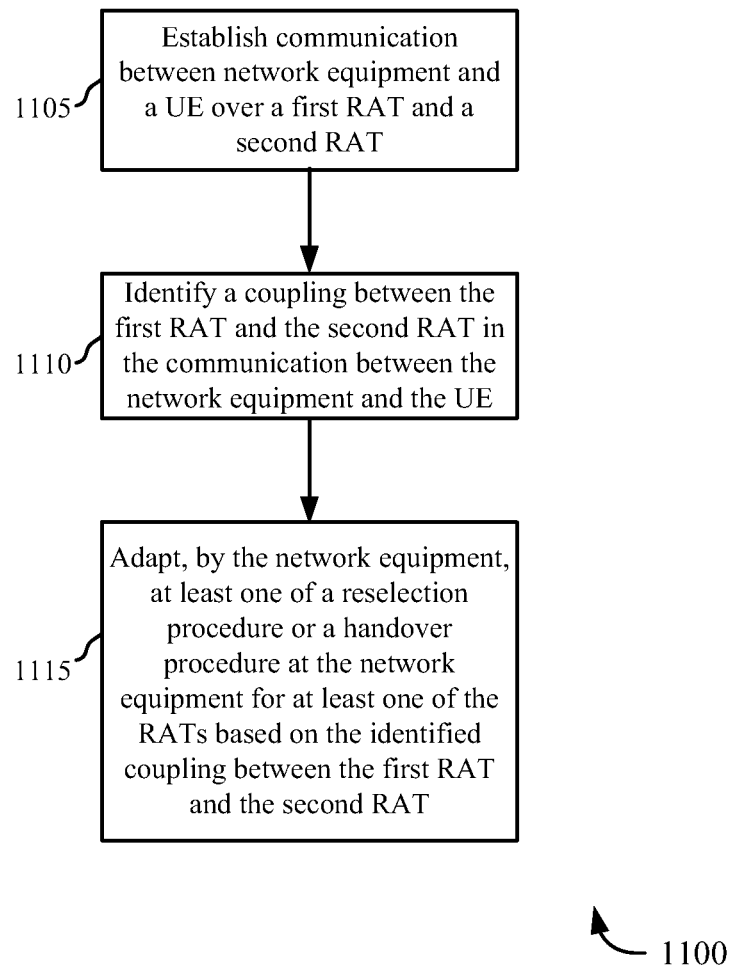
FIG. 11 shows a flowchart of an illustrative method for managing wireless communications in accordance with various embodiments.

FIG. 11 is a flow chart of an illustrative method 1100 of managing wireless communications in a wireless communication system. The method 1100 may be performed, for example, by one or more of the network equipment 105 described above with reference to the previous Figures.

At block 1105, the network equipment may establish communication with a UE over a first RAT and a second RAT. At block 1110, the network equipment may identify a coupling between the first RAT and the second RAT in the communication between the network equipment and the UE. For example, the network equipment may determine that network traffic communicated between the network equipment and the UE over both the first RAT and the second RAT is supported by a common set of one or more bearers. At block 1115, the network equipment may adapt a reselection or handover procedure based at least in part on the identified handover event and the coupling between the first and second RATs.

The detailed description set forth above in connection with the appended drawings describes exemplary embodiments and does not represent the only embodiments that may be implemented or that are within the scope of the claims. The terms "exemplary" or "illustrative" used throughout this description mean "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communications by a user equipment (UE), comprising:
 establishing communication between the UE and a source base station over a first radio access technology (RAT) and a second RAT;
 identifying a coupling between the first RAT and the second RAT in the communication between the UE and the source base station; and
 adapting, by the UE in response to determining that a handover procedure for the first RAT has occurred or is imminent, a handover procedure for the second RAT to a target base station based on the identified coupling between the first RAT and the second RAT, wherein the adapting comprises configuring the UE to initiate a handover event for the second RAT in response to detection of a handover event for the first RAT.

2. The method of claim 1, wherein identifying the coupling between the first RAT and the second RAT comprises:
 determining that network traffic communicated between the UE and the source base station over the first RAT and the second RAT is supported by at least one same bearer.

3. The method of claim 2, further comprising:
 determining that a handover of the UE would affect an ability of the UE to continue communicating network traffic supported by the at least one same bearer over both the first RAT and the second RAT at a current rate;
 wherein the adapting the handover procedure is in response to the determination that the handover would affect the ability of the UE to continue communicating network traffic supported by the at least one same bearer over both the first RAT and the second RAT at the current rate.

4. The method of claim 1, wherein identifying the coupling between the first RAT and the second RAT comprises:

identifying a carrier aggregation of at least one carrier of the first RAT with at least one carrier of the second RAT; or
determining that the source base station comprises collocated elements associated with the first RAT and the second RAT.

5. The method of claim 1, wherein identifying the coupling between the first RAT and the second RAT comprises:
 receiving a unicast message from the source base station over one of the RATs, the message indicating the coupling between the first RAT and the second RAT; or
 receiving a broadcast message over at least one of the RATs advertising the coupling between the first RAT and the second RAT.

6. The method of claim 1, further comprising:
 configuring the UE to initiate the handover event for the second RAT in response to a determination that a target base station of the handover event for the second RAT satisfies at least one predetermined criterion, wherein the at least one predetermined criterion comprises a determination that a target base station of the handover event for the first RAT and the target base station of the handover event for the second RAT supports the coupling of the first RAT and the second RAT.

7. The method of claim 6, further comprising:
 configuring the UE to initiate the handover event for the second RAT in response to a determination that the target base station of the handover event for the first RAT is collocated with the target base station of the handover event for the second RAT.

8. The method of claim 1, wherein adapting the handover procedure for at least one of the RATs the second RAT comprises:
 configuring the UE to initiate the handover event for the second RAT based on a message received from the source base station over the first RAT or the second RAT.

9. The method of claim 8, wherein the message received from the source base station is in response to the handover event for the first RAT.

10. The method of claim 1, wherein adapting the handover procedure for the second RAT comprises:
 configuring the UE to suppress a default handover procedure for the second RAT.

11. The method of claim 1, wherein adapting the handover procedure for the second RAT comprises:
 modifying a set of measurement events configured to trigger the UE to perform at least one of: obtaining channel measurements or providing measurement reports to the source base station.

12. The method of claim 1, further comprising:
 transmitting and receiving wireless traffic over a set of ports associated with one of the RATS;
 wherein the handover procedure is adapted for a subset of the set of ports.

13. A user equipment (UE) apparatus, comprising:
 a first radio associated with a first radio access technology (RAT);
 a second radio associated with a second RAT;
 a processor; and
 a memory in electronic communication with the processor, the memory embodying instructions, the instructions executable by the processor to:
 establish communication between the UE apparatus and a source base station over the first RAT and the second RAT;

identify a coupling between the first RAT and the second RAT in the communication between the UE apparatus and the source base station; and adapt, in response to determining that a handover procedure for the first RAT has occurred or is imminent, a handover procedure for the second RAT to a target base station based on the identified coupling between the first RAT and the second RAT, and configure the UE apparatus to initiate a handover event for the second RAT in response to detection of a handover event for the first RAT.

14. The UE apparatus of claim 13, the memory further comprising instructions being executable by the processor to:

determine that network traffic communicated between the UE apparatus and the source base station over the first RAT and the second RAT is supported by at least one same bearer.

15. The UE apparatus of claim 14, the memory further comprising instructions being executable by the processor to:

determine that handover of the UE apparatus would affect an ability of the UE apparatus to continue communicating network traffic supported by the at least one same bearer over both the first RAT and the second RAT at a current rate;

wherein adapting the handover procedure is in response to the determination that the handover would affect the ability of the UE apparatus to continue communicating network traffic supported by the at least one same bearer over both the first RAT and the second RAT at the current rate.

16. A method of wireless communications by a source base station, comprising:

establishing communication between the source base station and a user equipment (UE) over a first radio access technology (RAT) and a second RAT;

identifying a coupling between the first RAT and the second RAT in the communication between the source base station and the UE; and adapting, by the source base station in response to determining that a handover procedure for the first RAT has occurred or is imminent, a handover procedure for the second RAT to a target base station based on the identified coupling between the first RAT and the second RAT, wherein the adapting comprises configuring the source base station to initiate a handover event for the second RAT in response to detection of a handover event for the first RAT.

17. The method of claim 16, wherein identifying the coupling between the first RAT and the second RAT comprises:

determining that network traffic communicated between the source base station and the UE over the first RAT and the second RAT is supported by at least one same bearer.

18. The method of claim 17, further comprising:

determining that a handover of the UE would affect an ability of the UE to continue communicating network traffic supported by the at least one same bearer over both the first RAT and the second RAT at a current rate;

wherein the adapting the handover procedure is in response to the determination that the handover would affect the ability of the UE to continue communicating network traffic supported by the at least one same bearer over both the first RAT and the second RAT at the current rate.

19. The method of claim 16, wherein identifying the coupling between the first RAT and the second RAT comprises:

identifying a carrier aggregation of at least one carrier of the first RAT with at least one carrier of the second RAT; or determining that the source base station comprises collocated elements associated with the first RAT and the second RAT.

20. The method of claim 16, wherein adapting the handover procedure for at least one of the RATs the second RAT comprises:

detecting the handover event of the UE for the first RAT; and transmitting a message to the UE, in response to the handover event for the first RAT, the message identifying a target associated with the handover event for the second RAT.

21. The method of claim 20, further comprising:

transmitting the message to the UE in further response to a determination that a target of the handover event for the first RAT and the target of the handover event for the second RAT support the coupling between the first RAT and the second RAT.

22. The method of claim 16, wherein the adapting the handover procedure comprises:

communicating with the UE to modify a set of measurement events configured to trigger the UE to perform at least one of: obtaining channel measurements or providing measurement reports to the source base station.

23. The method of claim 22, wherein modifying the set of measurement events comprises:

configuring at least one new value of a signal strength threshold that triggers the UE to perform channel measurements or provide a measurement report to the source base station.

24. The method of claim 16, wherein the adapting the handover procedure is further based on measured network conditions of at least one of the RATs.

25. The method of claim 16, wherein the adapting the handover procedure is further based on at least one of a policy stored by the source base station or a service class of the UE.

26. The method of claim 16, wherein at least one of the RATs comprises a wireless wide area network (WWAN) RAT and the other of the RATs comprises a wireless local area network (WLAN) RAT.

27. A source base station apparatus, comprising:

a first radio associated with a first radio access technology (RAT);

a second radio associated with a second RAT;

a processor; and a memory in electronic communication with the processor, the memory embodying instructions, the instructions executable by the processor to:

establish communication between the source base station apparatus and a user equipment (UE) over the first RAT and the second RAT;

identify a coupling between the first RAT and the second RAT in the communication between the source base station apparatus and the UE; and adapt, in response to determining that a handover procedure for the first RAT has occurred or is imminent, a handover procedure for the second RAT to a target base station for at least one of the RATs based on the identified coupling between the first RAT and the second RAT, and configure the source base station to initiate a handover event for the second RAT in response to detection of a handover event for the first RAT.

28. The source base station apparatus claim 27, further comprising instructions being executable by the processor to:
determine that network traffic communicated between the source base station apparatus and the UE over the first RAT and the second RAT is supported by at least one same bearer.

29. The source base station apparatus of claim 27, the memory further comprising instructions being executable by the processor to:
detect the handover event of the UE for the first RAT; and
transmit a message to the UE, in response to the handover event for the first RAT, the message triggering the handover event of the UE for the second RAT.

* * * * *